(12) United States Patent
Hirata

(10) Patent No.: US 6,925,567 B1
(45) Date of Patent: Aug. 2, 2005

(54) REMOTE CONTROL OF VCR WITH ELECTRONIC MAIL

(75) Inventor: Shinichi Hirata, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/059,765

(22) Filed: Apr. 14, 1998

(30) Foreign Application Priority Data

Apr. 16, 1997 (JP) .......................................... P9-098672

(51) Int. Cl.[7] ............................ H04L 9/32; H04N 7/167

(52) U.S. Cl. ...................................... 713/189; 380/239

(58) Field of Search ................................ 380/200–202, 380/239–242; 713/189, 200–202, 151, 152

(56) References Cited

U.S. PATENT DOCUMENTS

| | | | | | |
|---|---|---|---|---|---|
| 613,809 | A | * | 11/1898 | N. Testa ......................... | 446/1 |
| 2,292,387 | A | * | 8/1942 | Markey et al. ................. | 250/2 |
| 5,428,784 | A | * | 6/1995 | Cahill, Jr. ..................... | 709/206 |
| 5,625,693 | A | * | 4/1997 | Rohatgi et al. ............... | 380/25 |
| 5,652,892 | A | * | 7/1997 | Ugajin ......................... | 395/325 |
| 5,722,041 | A | * | 2/1998 | Freadman ..................... | 455/6.3 |
| 5,819,110 | A | * | 10/1998 | Motoyama .................... | 395/835 |
| 5,887,216 | A | * | 3/1999 | Motoyama ...................... | 399/8 |
| 5,956,487 | A | * | 9/1999 | Venkatraman et al. . | 395/200.48 |
| 6,020,881 | A | * | 2/2000 | Naughton et al. .......... | 345/327 |
| 6,374,406 | B2 | | 4/2002 | Hirata | |

FOREIGN PATENT DOCUMENTS

| | | | | | |
|---|---|---|---|---|---|
| EP | 0917052 | A | * | 5/1999 | .................. 395/325 |
| JP | 10-261251 | | | 9/1998 | ........... G11B/15/02 |
| JP | 9781034 | | * | 10/1998 | ............ H04Q/9/00 |

OTHER PUBLICATIONS

Bob Brown and Wayne Eckerson, Users Demanding help in Managing Big E–mail Nets, Feb. 8, 1993 Network World.*
Dave Brambet and Patricia Schnaidt, Networld Boston (Upgrade was the Watchword at the Skit–Studded Expo), LAN Magazine May 1992, 7(5) p. 155.*
Bruce Schneier, E–Mail Security, How to Keep Your Electrtonic Message Private, John Wiley & Sons, Inc.1995.*
Schneier, E–Mail Security, How to Keep Your Electronic Messages Private, John Wiley 1995.*
Simmons, Contempory Cryptology, The Scince of Information Integrity, IEEE Press, 1992, pp. 220–221, 408–415.*
Schneier, E–Mail Security, How to Keep Your Electronic Messages Private, John Wiley, 1995,Fig 1.1.*

(Continued)

Primary Examiner—Hosuk Song
(74) Attorney, Agent, or Firm—Oblon, Spivak, McClelland, Maier & Neustadt, P.C.

(57) ABSTRACT

A security apparatus and a security method for controlling electric devices by use of electronic mails. A modem receives an electronic mail sent from a sending side and stores the received electronic mail into a RAM of a controller. A CPU extracts certification information encrypted by a secret key of a user of the sending side and decrypts the certification information by use of a public key. Based on the decrypted information, the CPU determines whether the user of the sending side is authentic or not. Only when the user is found authentic, the CPU extracts a control command from the received electronic mail and stores the extracted control command into a RAM. Then, the CPU transmits an electronic mail to the sending side for confirming content of the control. If an electronic mail for approving the confirmation is returned from the sending side, the CPU extracts second certification information obtained by encrypting information different from that mentioned above, determines again whether the sender of the electronic mail is authentic, and, if the sender is found authentic, executes the control command received before.

6 Claims, 21 Drawing Sheets

OTHER PUBLICATIONS

Goldberg et al. Beyond the Web: Excavating–the Real World Via Mosaic, Second International WWW Conference, Chicago, Il. Oct. 17–21, 1994.

Berardinis, Appliances On–Line, Machine Design, Aug. 1996.*

Bruce Schneier, E–mail Security: How to Keep our Electronic Messages Private, John Wiley Chapter 1, 1995.*

Berardinis, Appliances On–line, Machine Design, pp. 72–79, 1995.*

* cited by examiner

FIG. 6

TO:home-server @ bar. sony. co. jp
From:foo@ sm. sony. co. jp
Cc:mother@ sm. sony. co. jp
Subject:VIDEO Reservation VIDEO Reservation

| DATE | FROM | TO | CH | SPEED |
|------|-------|-------|----|-------|
| 10 | 11:00 | 12:00 | 3 | SP |

PLEASE CHECK THE RESERVATION

EncriptedDATA-First
ASASJKDKSDSljjdsdjsuu`&%%!#@#@jasdauuihmkklsakdo
qwqeweipodasdiaidaiduckzxjzx&&` `%` !@E#JHBCJCHXZC

| FIG. 7A | FIG. 7B |

FIG. 8

TO:foo@sm.sony.co.jp
From:home-server@bar.sony.co.jp
Subject:VIDEO Reservation

VIDEO Reservation

| DATE | FROM | TO | CH | SPEED |
|---|---|---|---|---|
| 10 | 11:00 | 12:00 | 3 | SP |

RESERVATION FAILED BECAUSE RESERVATION DATA SENT AS ABOVE PARTIALLY OVERLAP WITH DATA OF RESERVATION NUMBER 1 IN RECORDING TIME.

EncriptedDATA-First

ASASJKDKSDSIjjdsdjsuu^&%%!#@#@jasdauuihmkklsakdo
qwqeweipodasdiaidaiduckzxjzx&&^^%^!@E#JHBCJCHXZC

FIG. 9

TO:foo@sm.sony.co.jp
From:home-server@bar.sony.co.jp
Subject:VIDEO Reservation

ACCEPTANCE NUMBER 1 (TEMPORARY RESERVATION)
VIDEO Reservation

| DATE | FROM | TO | CH | SPEED |
|------|-------|-------|----|-------|
| 10 | 11:00 | 12:00 | 3 | SP |

TEMPORARY RESERVATION MADE AS ABOVE.
CHECK THE CONTENT AND RETURN FOR FIXED RESERVATION.

EncriptedDATA-First

ASASJKDKSDSIjjdsdjsuu˙&%%!#@#@jasdauuihmkklsakdo
qwqeweipodasdiaidaiduckzxjzx&&˙˙%˙!@E#JHBCJCHXZC

FIG. 12

TO:home-server@bar.sony.co.jp
From:foo@sm.sony.co.jp
Subject:VIDEO Reservation

RESERVATION NUMBER 1 (TEMPORARY RESERVATION)
VIDEO Reservation

DATE   FROM    TO     CH    SPEED
 10    11:00  12:00    3      SP

TEMPORARY RESERVATION MADE AS ABOVE.
CHECK THE CONTENT AND RETURN FOR FIXED RESERVATION.

EncriptedDATA-First

ASASJKDKSDSIjjdsdjsuu˚&%%!#@#@jasdauuihmkklsakdo
qwqeweipodasdiaidaiduckzxjzx&&˚˚%˚!@E#JHBCJCHXZC EncriptedDATA-Second idoapsdauiuwe˚&˚(&˚SADDSADA&˚DAS)D)(˚ADLLKASLDApp 0 0
[=07897$˚%˚%BMNBNHHxxazxtbddaGHDSAuduygaddh
asdadaudyasuydasdyaduayadyaXTYUZXTqwdvvansbdvXUY

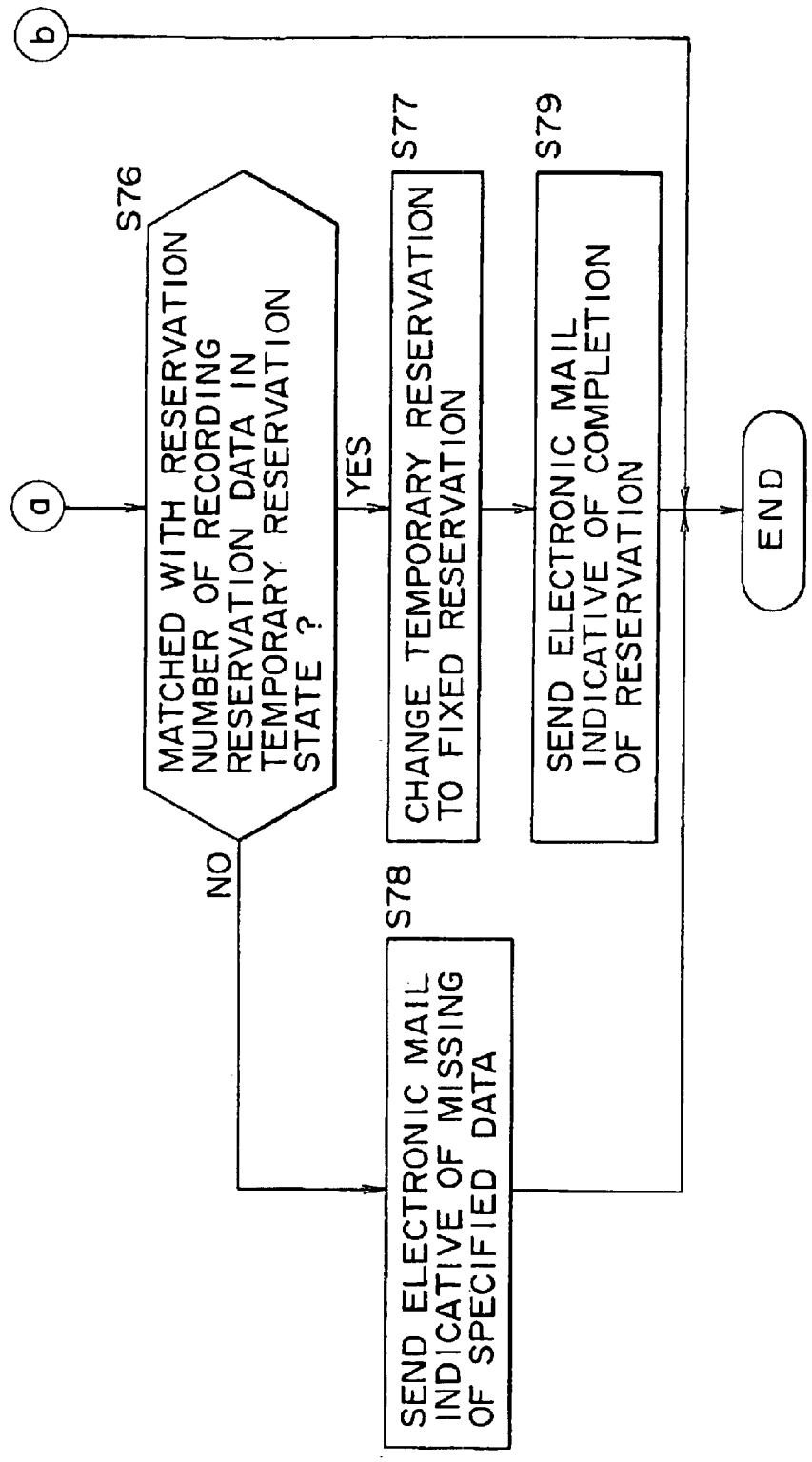

FIG. 14

TO: foo@sm.sony.co.jp
From: home-server@bar.sony.co.jp
Subject: VIDEO Reservation

RESERVATION NUMBER 1

VIDEO Reservation

| DATE | FROM | TO | CH | SPEED |
|---|---|---|---|---|
| 10 | 11:00 | 12:00 | 3 | SP |

RESERVATION MADE AS ABOVE

EncriptedDATA-First

ASASJKDKSDSIjjdsdjsuu˜&%%!#@#@jasdauuihmkklsakdo
qwqeweipodasdiaidaiduckzxjzx&&˜˜%˜!@E#JHBCJCHXZC EncriptedDATA-Second idoapsdauiuwe˜&˜(&˜ SADDSADA&˜ DAS) D) (˜ADLLKASLDAp
p(X)[=07897$˜%˜%BMNBNHHxxazxtbddaGHDSAuduygaddh
asdadaudyasuydasdyaduayadyaXTYUZXTqwdvvansbdvXUY

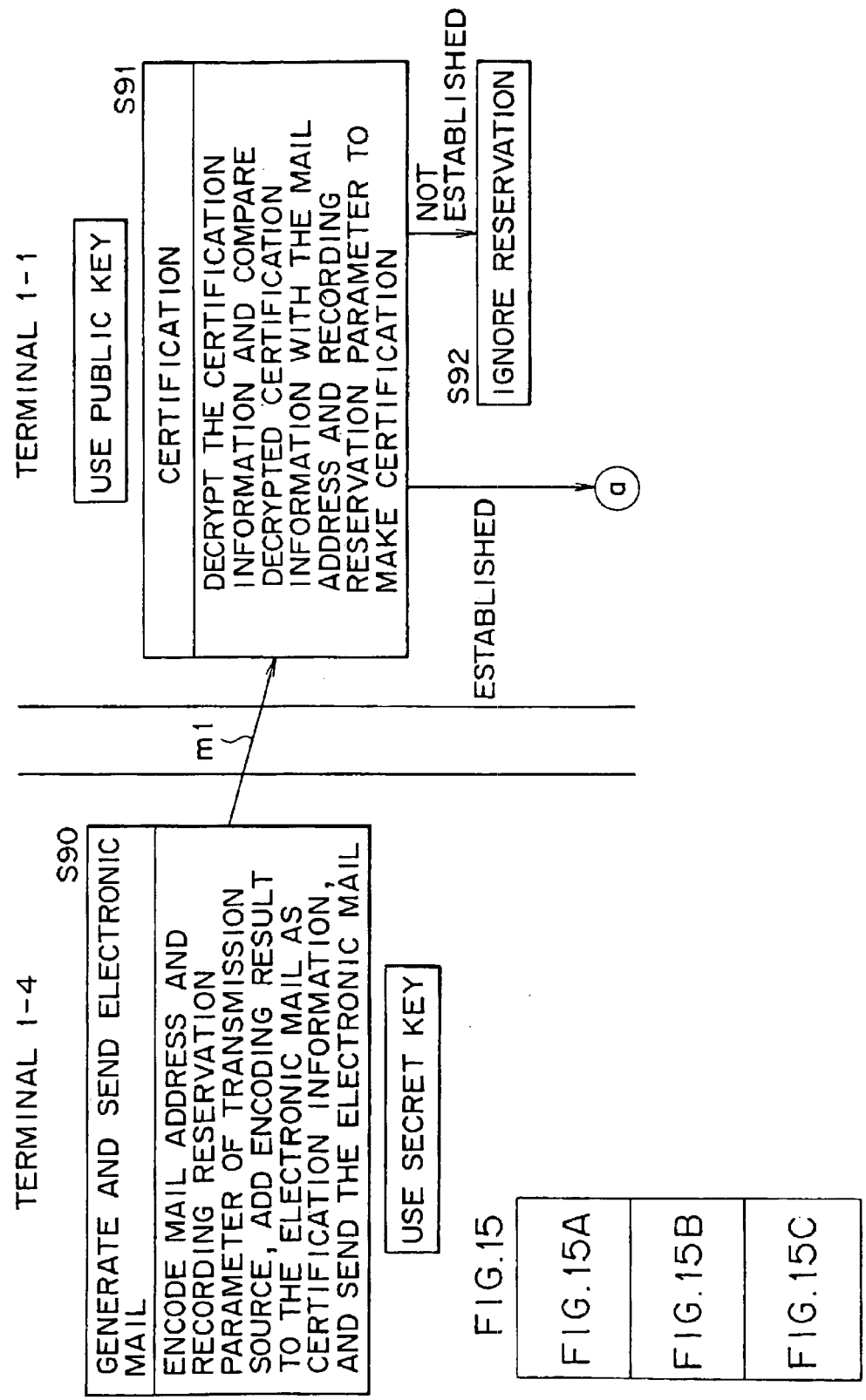

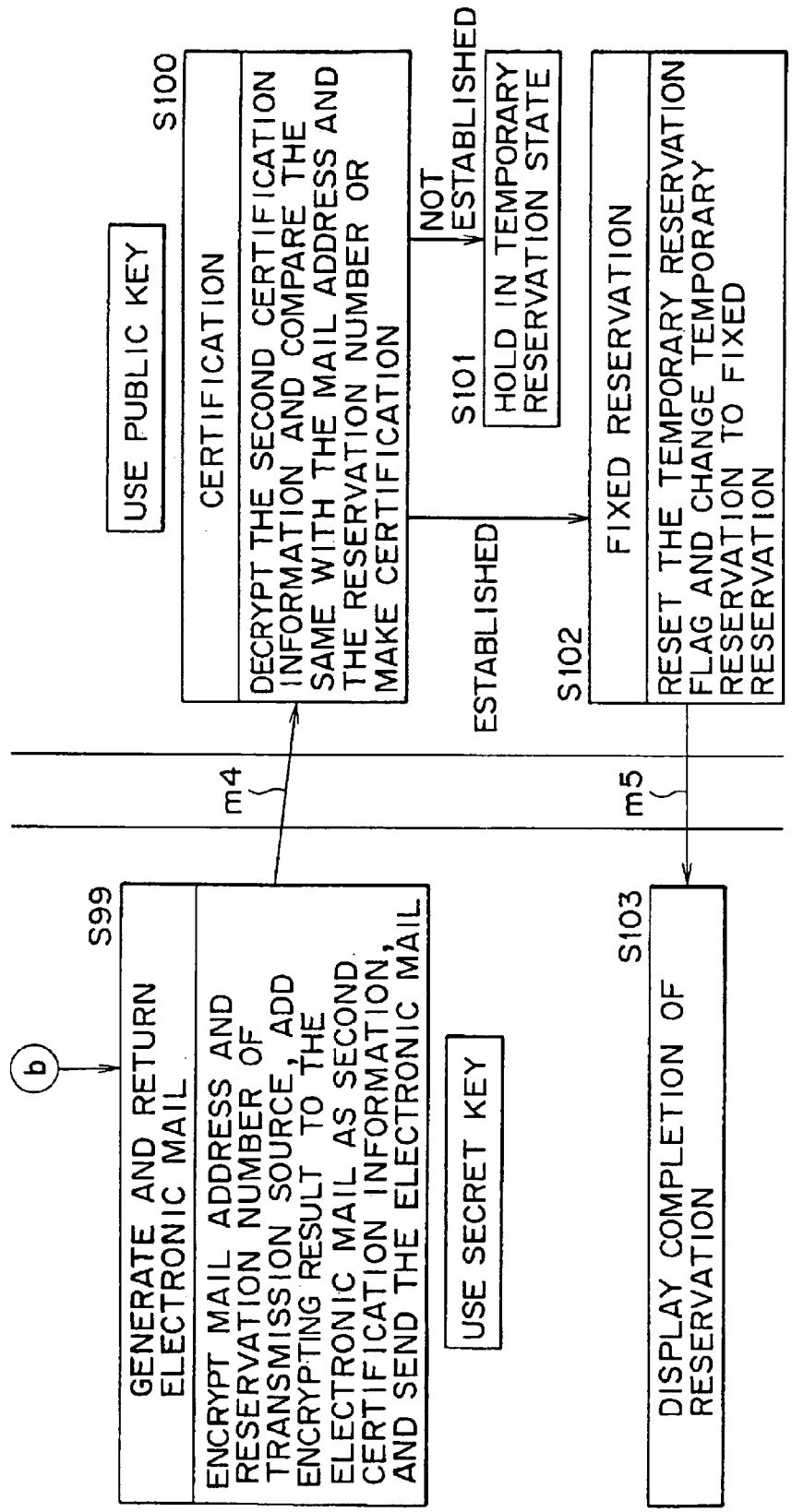

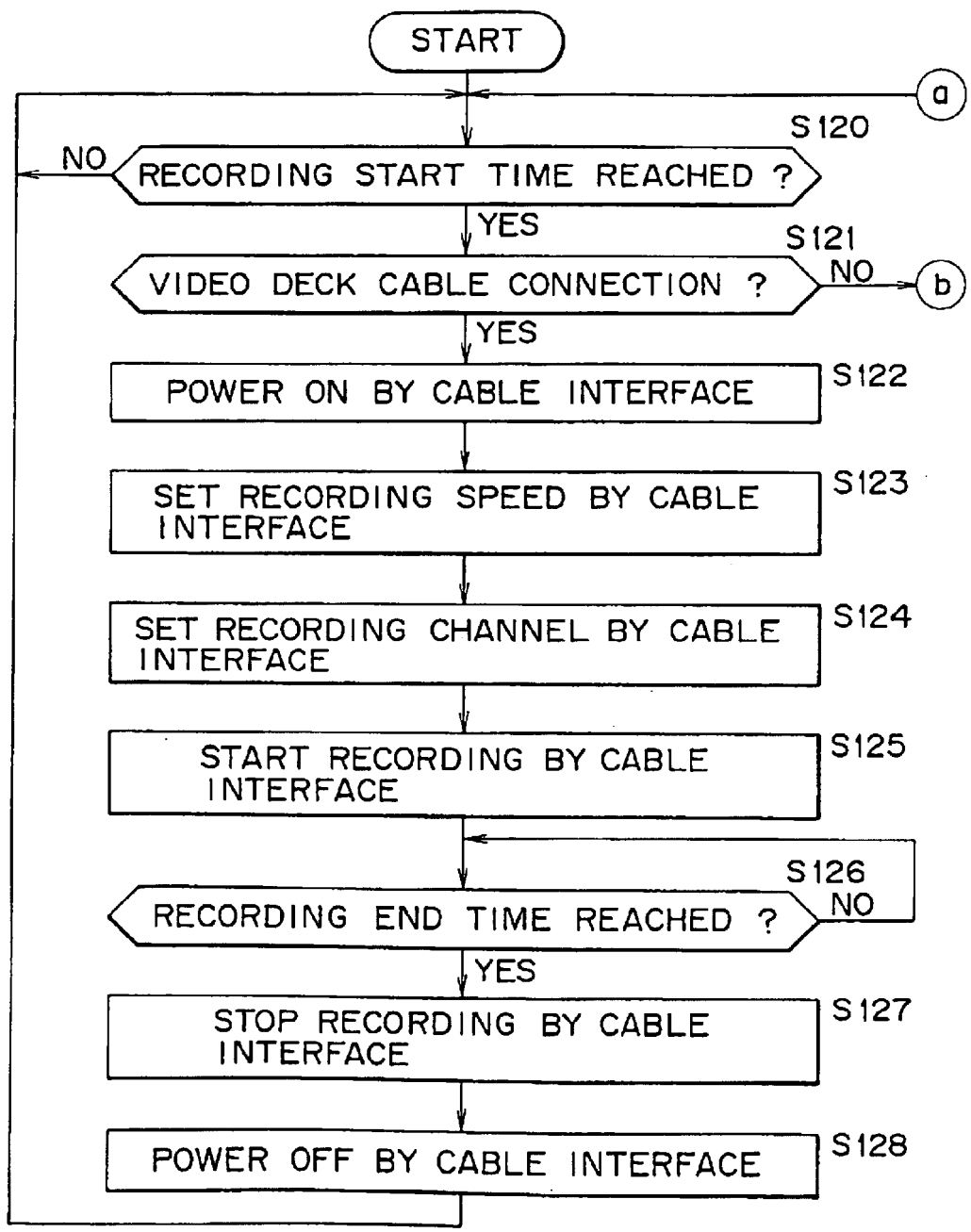

REMOTE CONTROL OF VCR WITH ELECTRONIC MAIL

BACKGROUND OF THE INVENTION

The present invention generally relates to a receiving apparatus, a receiving method, a transmitting apparatus, a transmitting method, a transmitting/receiving apparatus, and a transmitting/receiving method and, more particularly, to a receiving apparatus, a receiving method, a transmitting apparatus, a transmitting method, a transmitting/receiving apparatus, and a transmitting/receiving method that allow connection through a network.

Related art consumer electronics such as television receivers and video decks are controlled by operating controls arranged on the main frames or remote commanders of these devices.

It is also practical for a user to control related art consumer electronics by use of a timer capability that executes a control operation at any time preset by the user.

Recently, a home video deck, for example, can be controlled from outside a home in a so-called "interactive" manner by use of a telephone tone signal.

However, the electric devices that are controlled by operating the controls attached on these electronic devices or on the remote commanders thereof do not allow the user to control them if the user is away from home.

Further, even if an electric device is equipped with a timer, the same generally cannot be controlled from outside home, thereby making the user unable to cope with unexpected situations.

Still further, in controlling electric devices in an interactive manner by use of telephone line, it is necessary to operate controls in response to a voice sent from the receiving side (namely, an electric device), thereby presenting a problem of taking time. If a plurality of electric devices are installed in a home, attempting to control each of them in the same manner requires assigning each to a telephone line, thereby presenting a problem of increasing facilities cost.

To circumvent these problems, a method may be employed in which an electronic mail attached with a control command is sent to the receiving side and the same controls a specified electronic device based on the control command.

However, it is difficult for this method to certify whether the person who sent the electronic mail is an authorized user or not, thereby presenting a problem that the security of the device to be controlled cannot be ensured.

If a plurality of authorized users exist, it presents another problem that received control commands may be duplicate or contradictory to each other.

It is therefore an object of the present invention to enhance, when controlling electric devices by electronic mail, security of the electric devices under control and perform correct control thereon.

SUMMARY OF THE INVENTION

In carrying out the invention and according to a first aspect thereof, there is provided a receiving apparatus. In this receiving apparatus, a receiving means receives an electronic mail coming through a network. A first extracting means extracts encrypted certification information from the electronic mail received by the receiving means. A second extracting means extracts a control command for controlling a predetermined electric device from the electronic mail received by the receiving means. A decrypting means decrypts the certification information extracted by the first extracting means. A certifying means certifies, by referencing the certification information decrypted by the decrypting means, whether a sender of the electronic mail is an authorized user or not. If the sender of the electronic mail is found an authorized user, a storing means stores the control command extracted by the second extracting means. For example, the receiving means receives an electronic mail coming over the Internet. The first extracting means extracts, from the received electronic mail, certification information generated by encrypting predetermined text information by use of a secret key. The second extracting means extracts a control command for controlling a video deck for example. The certification information extracted by the first extracting means is decrypted by use of a public key. Based on the decrypted certification information, the certifying means determines whether the sender of the electronic mail is an authorized user. If the sender is found to be an authorized user, the storing means stores the control command extracted by the second extracting means.

In carrying out the invention and according to a second aspect thereof, there is provided a receiving method. In this receiving method, a receiving step receives an electronic mail coming through a network. A first extracting step extracts encrypted certification information from the electronic mail received by the receiving step. A second extracting step extracts a control command for controlling a predetermined electric device from the electronic mail received by the receiving step. A decrypting step decrypts the certification information extracted by the first extracting step. A certifying step certifies, by referencing the certification information decrypted by the decrypting step, whether a sender of the electronic mail is an authentic user or not. If the sender of the electronic mail is found to be an authentic user, a storing step stores the control command extracted by the second extracting step. For example, the receiving step receives an electronic mail coming over the Internet. The first extracting step extracts, from the received electronic mail, certification information generated by encrypting predetermined text information by use of a secret key. The second extracting step extracts a control command for controlling a video deck, for example. The certification information extracted by the first extracting step is decrypted by use of a public key. Based on the decrypted certification information, the certifying step determines whether the sender of the electronic mail is an authentic user. If the sender is found an authentic user, the storing step stores the control command extracted by the second extracting step.

In carrying out the invention and according to a third aspect thereof, there is provided a transmitting apparatus. In this transmitting apparatus, an electronic mail inputting means inputs an electronic mail. An encrypting means encrypts predetermined information. A first adding means adds, as certification information, the information encrypted by the encrypting means to the electronic mail inputted by the electronic mail inputting means. A second adding means adds a control command for controlling a predetermined electric device to the electronic mail inputted by the electronic mail inputting means. A transmitting means transmits through a network the electronic mail with the certification information added by the first adding means and the control command added by the second adding means. For example, the electronic mail inputting means inputs an electronic mail. The encrypting means encrypts predetermined text information included in the electronic mail. The first adding means adds, as certification information, the text information encrypted by the encrypting means to the electronic mail inputted by the electronic inputting means. The second adding means adds a control command for controlling a video deck for example to electronic mail. The transmitting means transmits over the Internet the electronic mail with the certification information added by the first adding means and the control command added by the second adding means.

In carrying out the invention and according to a fourth aspect thereof, there is provided a transmitting method. In this transmitting method, an electronic mail inputting step inputs an electronic mail. An encrypting step encrypts predetermined information. A first adding step adds, as certification information, the information encrypted in the encrypting step to the electronic mail inputted in the electronic mail inputting step. A second adding step adds a control command for controlling a predetermined electric device according to the electronic mail inputted in the electronic mail inputting step. A transmitting step transmits through a network the electronic mail with the certification information added in the first adding step and the control command added in the second adding step. For example, the electronic mail inputting step inputs an electronic mail into the Internet. The encrypting step encrypts predetermined text information included in the electronic mail. The first adding step adds, as certification information, the text information encrypted in the encrypting step to the electronic mail inputted in the electronic inputting step. The second adding step adds a control command for controlling a video deck, for example, to the electronic mail. The transmitting step transmits over the Internet the electronic mail with the certification information added in the first adding step and the control command added in the second adding step.

In carrying out the invention and according to a fifth aspect thereof, there is provided a transmitting/receiving apparatus. In a transmitting side of this transmitting/receiving apparatus, an electronic mail inputting means inputs an electronic mail. An encrypting means encrypts predetermined information. A first adding means adds, as certification information, the information encrypted by the encrypting means to the electronic mail inputted by the electronic mail inputting means. A second adding means adds a control command for controlling a predetermined electric device to the electronic mail inputted by the electronic mail inputting means. A transmitting means transmits over a network the electronic mail with the certification information added by the first adding means and the control command added by the second adding means. In a receiving side of this transmitting/receiving apparatus, a receiving means receives the electronic means transmitted over the network. A first extracting means extracts the certification information from the electronic mail received by the receiving means. A second extracting means extracts the control command from the electronic mail received by the receiving means. A decrypting means decrypts the certification information extracted by the first extracting means. Referencing the certification information decrypted by the decrypting means, a certifying means certifies whether a sender of the electronic mail is an authentic user. If the sender of the electronic mail is found an authentic user, a storing means stores the control command extracted by the second extracting means. For example, in the transmitting side, the electronic mail inputting means inputs an electronic mail. The encrypting means encrypts predetermined text information included in the electronic mail. The first adding means adds, as certification information, the information encrypted by the encrypting means to the electronic mail inputted by the electronic mail inputting means. The second adding means adds a control command for controlling a video deck for example to the electronic mail. The transmitting means transmits over the Internet the electronic mail with the certification information added by the first adding means and the control command added by the second adding means. In the receiving side, the receiving means receives the electronic mail coming over the Internet. The first extracting means extracts certification information generated by encrypting predetermined text information by use of a secret key from the received electronic mail. The second extracting means extracts a control command for controlling a video deck for example from the received mail. The decrypting means decrypts, by use of a public key, the certification information extracted by the first extracting means. Referencing the decrypted certification information, the certifying means certifies whether a sender of the electronic mail is an authentic user. If the sender is found an authentic user, the storing means stores the control command extracted by the second extracting means.

In carrying out the invention and according to a fifth aspect thereof, there is provided a transmitting/receiving method. In a transmitting side of this transmitting/receiving method, an electronic mail inputting step inputs an electronic mail. An encrypting step encrypts predetermined information. A first adding step adds, as certification information, the information encrypted in the encrypting step to the electronic mail inputted in the electronic mail inputting step. A second adding step adds a control command for controlling a predetermined electric device to the electronic mail inputted in the electronic mail inputting step. A transmitting step transmits over a network the electronic mail with the certification information added in the first adding step and the control command added in the second adding step. In a receiving side of this transmitting/receiving method, a receiving step receives the electronic step transmitted over the network. A first extracting mail extracts the certification information from the electronic mail received in the receiving step. A second extracting step extracts the control command from the electronic mail received in the receiving step. A decrypting step decrypts the certification information extracted in the first extracting step. Referencing the certification information decrypted in the decrypting step, a certifying step certifies whether a sender of the electronic mail is an authorized user. If the sender of the electronic mail is found an authorized user, a storing step stores the control command extracted in the second extracting step. For example, in the transmitting side, the electronic mail inputting step inputs an electronic mail. The encrypting step encrypts predetermined text information included in the electronic mail. The first adding step adds, as certification information, the information encrypted in the encrypting step to the electronic mail inputted in the electronic mail inputting step. The second adding step adds a control command for controlling a video deck, for example, to the electronic mail. The transmitting step transmits over the Internet the electronic mail with the certification information added in the first adding step and the control command added in the second adding step. In the receiving side, the receiving step receives the electronic mail coming over the Internet. The first extracting step extracts certification information generated in encrypting predetermined text information in use of a secret key from the received electronic mail. The second extracting step extracts a control command for controlling a video deck for example from the received mail. The decrypting step decrypts, by use of a public key, the certification extracted in the first extracting step. Referencing the decrypted certification information, the certifying step certifies whether a sender of the electronic mail is an authorized user. If the sender is found an authorized user, the storing step stores the control command extracted in the second extracting step.

According to the receiving apparatus and the receiving method associated with the present invention, an electronic mail transmitted over a network is received. Encrypted certification information is extracted from the received electronic mail. A control command for controlling a predetermined electric device is extracted from the received electronic mail. The extracted certification information is decrypted. The decrypted certification information is referenced to certify whether a sender of the electronic mail is an authorized user. If the sender is found an authorized user, the extracted control command is stored. This novel constitution allows only the information sent from an authorized user to be received for storage.

According to the transmitting apparatus and the transmitting method associated with the present invention, an electronic mail is inputted. Predetermined information is encrypted. The encrypted information is added, as certification information, to the inputted electronic mail. A control command for controlling a predetermined electric device is added to the inputted electronic mail. The electronic mail added with the certification information and the control command is transmitted. This novel constitution allows the receiving side to easily and reliably determine whether the sender of the electronic mail is an authorized user or not.

According to the transmitting/receiving apparatus and the transmitting/receiving method associated with the present invention, in the transmitting side, an electronic mail is inputted. Predetermined information is encrypted. The encrypted information is added to the inputted electronic mail as certification information. A control command for controlling a predetermined electric device is added to the inputted electronic mail. The electronic mail added with the certification information and the control command is transmitted over a network. In the receiving side, the electronic mail coming over the network is received. The certification information is extracted from the received electronic mail. The control command is extracted from the received electronic mail. The extracted certification information is decrypted. Based on the decrypted certification information, it is determined whether the sender of the electronic mail is an authorized user. If the sender is found an authorized user, the extracted control command is stored. This novel constitution allows the receiving side to determine, based on the certification information added to the electronic mail at the sending side, whether the sender is an authorized user, thereby extracting the control command from the electronic mail for storage only when the sender is found an authorized user.

BRIEF DESCRIPTION OF THE DRAWINGS

These and other objects of the invention will be seen by reference to the description, taken in connection with the accompanying drawing, in which:

FIG. 6 is a diagram illustrating, by way of example, an electronic mail which is generated when "OK" button is pressed in the input screen shown in FIG. 4;

FIG. 8 is a diagram illustrating, by way of example, an electronic mail to be sent if it is indicated in the flowchart shown in FIG. 7 that the reservation is disabled;

FIG. 9 is a diagram illustrating, by way of example, an electronic mail to be sent when a temporary reservation has been completed in the flowchart shown in FIG. 7;

FIG. 12 is a diagram illustrating, by way of example, an electronic mail to be sent when "SEND" button is pressed in the display screen show in FIG. 11;

FIG. 14 is a diagram illustrating, by way of example, an electronic mail to be sent when reservation has been completed in the flowchart shown in FIG. 13;

FIGS. 15B and 15C are flowcharts for describing, by way of example, a sequence of processing operations for reserving recording on video deck 27.

DETAILED DESCRIPTION OF PREFERRED EMBODIMENTS

This invention will be described in further detail by way of example with reference to the accompanying drawings.

Figure 1:
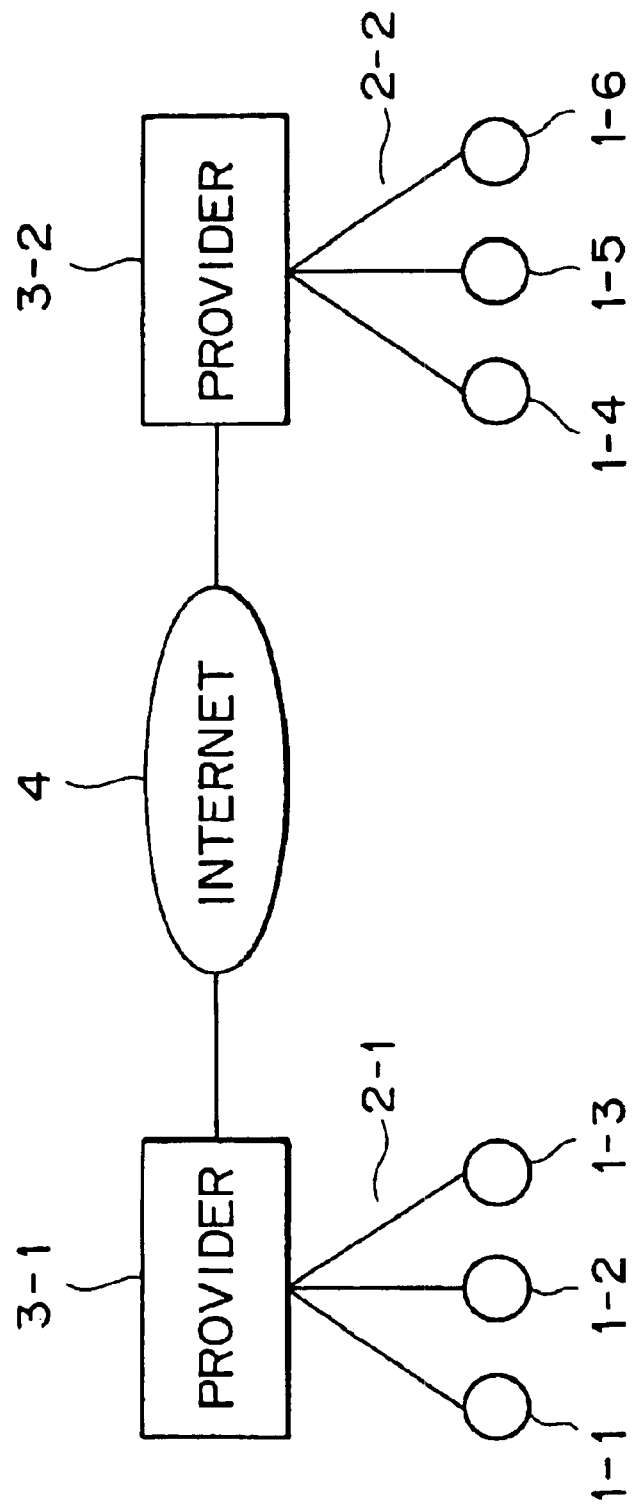
FIG. 1 is a schematic diagram illustrating, by way of example, a constitution of a preferred embodiment of the invention.

Now, referring to FIG. 1, there is shown a schematic view of a constitution of a preferred embodiment of the invention by way of example. In the figure, terminals 1—1 through 1-3 and 1-4 through 1-6 are connected to providers 3-1 and 3-2 over public telephone lines 2-1 and 2—2 (analog lines or ISDN (Integrated Services Digital Network) lines for example) respectively. Under the control of the providers 3-1 and 3-2, these terminals can transfer information to and from each other.

The providers 3-1 and 3-2 are adapted to establish a connection based on TCP/IP (Transmission Control Protocol/Internet Protocol), namely a dial-up IP connection, with any of the terminals 1—1 through 1-6 when the same calls the corresponding provider over the corresponding public telephone line 2-1 or 2—2.

The Internet 4 interconnects the providers 3-1 and 3-2 and communicates information therebetween based on the above-mentioned TCP/IP.

Figure 2:
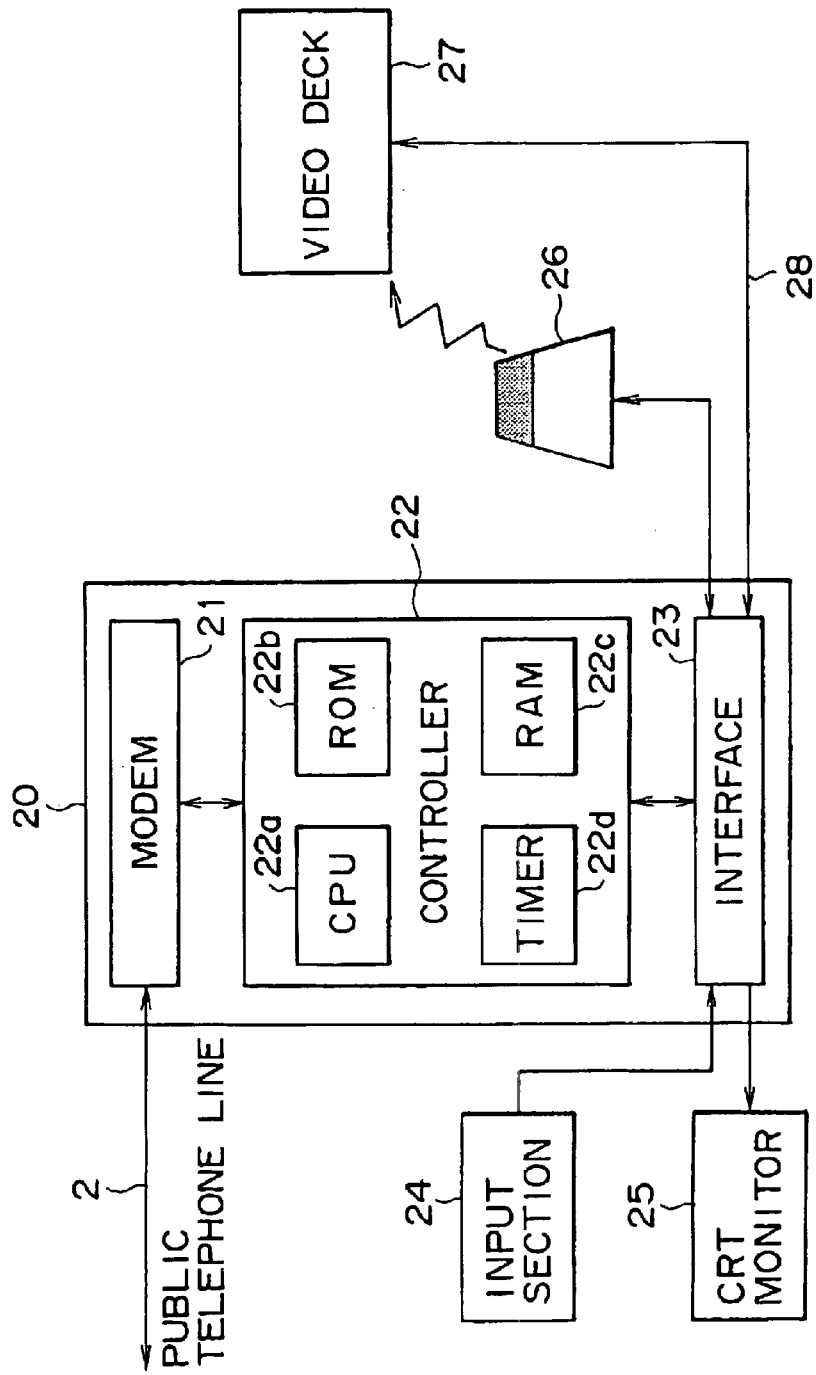
FIG. 2 is a block diagram illustrating, by way of example, a detailed constitution of a terminal 1—1 shown in FIG. 1.

Referring to FIG. 2, there is shown a block diagram illustrating an electrical constitution of the terminal 1—1 shown in FIG. 1 by way of example. As shown in FIG. 2, a gateway 20 transfers information with other terminals over the public telephone 2-1.

An input block 24 is composed of a keyboard and a mouse, for example, and operated to input predetermined information into the gateway 20. A CRT (Cathode Ray Tube) Monitor 25 is adapted to display received information and the information inputted from the input block 24.

An IR (InfraRed) transmitter 26 radiates an infrared ray under the control of the gateway 20 to control a video deck 27.

A connection cable 28 is a signal line based on a home bus such as Wired CIRCS or LANC (a local bus for interrelating a plurality of video devices for example for controlling the same) and adapted to transfer information between the gateway 20 and the video deck 27. The video deck 27 is adapted to perform operations such as recording, reproducing, and stop according to a control signal transmitted through the IR transmitter 26 or the connection cable 28.

It should be noted that the gateway 20 is composed of a modem 21, a controller 22, and an interface 23 (a executing means).

The modem 21 is adapted to alternately convert a signal (analog) over the public telephone line 2 and a signal (digital) in the controller 22 such that information becomes transferable between the public telephone line 2 and the controller 22.

The controller 22 is composed of a CPU (Central Processing Unit) 22a (a first extracting means, a second extracting means, a decoding means, and certification means), a ROM (Read Only Memory) 22b, a RAM (Random. Access Memory) 22c (a storage means), and a timer 22d.

The CPU 22a performs various computations and, at the same time, controls the other parts of the terminal 1—1. The ROM 22b stores a program to be executed by the CPU 22a and data necessary for the processing to be executed in the terminal. The RAM 22c temporarily stores data and so on generated by the computation performed by the CPU 22a. The timer 22d is adapted to output the current time and date.

Figure 3:
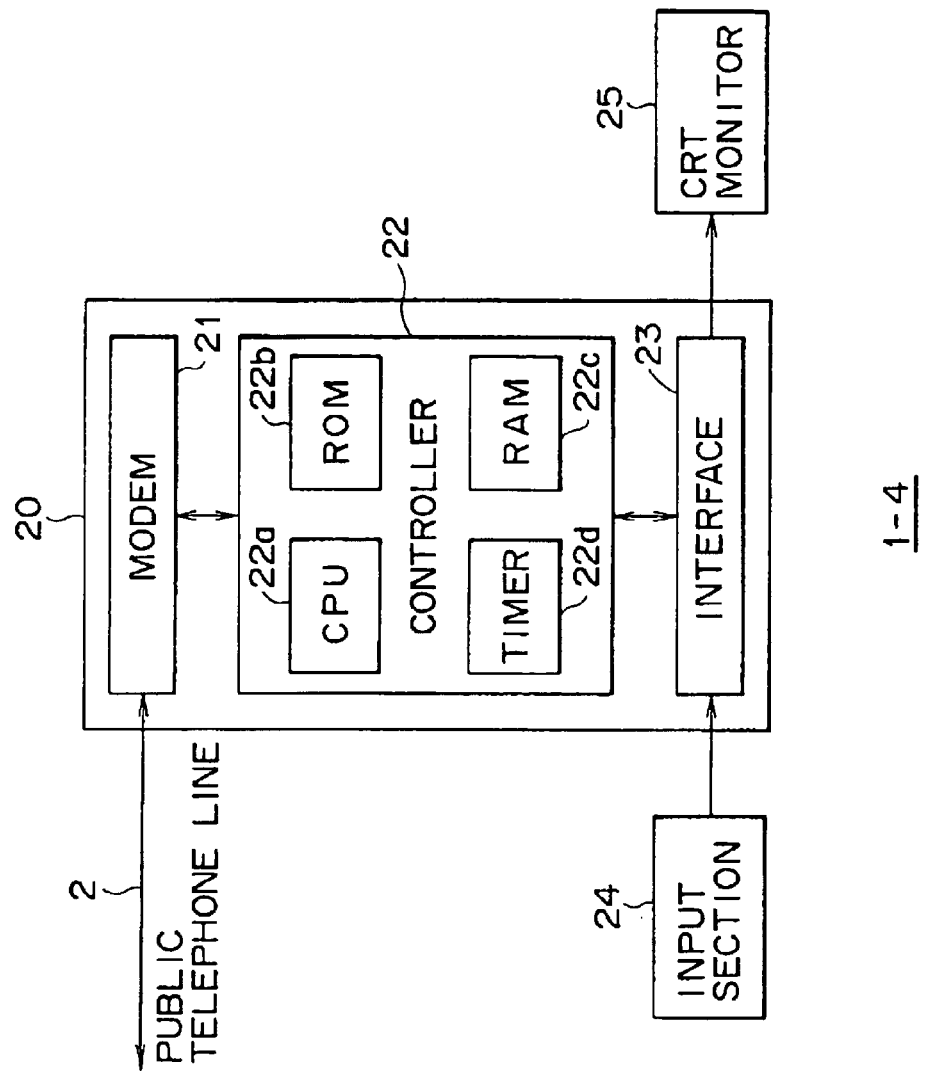
FIG. 3 is a block diagram illustrating, by way of example, a detailed constitution of a terminal 1-4 shown in FIG. 1.

Referring to FIG. 3, there is shown a block diagram illustrating, by way of example, a detailed constitution of the terminal 1-4 shown in FIG. 1. With reference to FIG. 3, components similar to those previously described with FIG. 2 are denoted by the same reference numerals and will not be described any further.

As shown in FIG. 3, the terminal 1-4 has generally the same constitution as that of the terminal 1—1 except that the IR transmitter 26, the video deck 27, and the connection cable 28 are excluded.

The following describes the operation of the above-mentioned preferred embodiment.

It is assumed that a terminal installed in the home of a user is the terminal 1—1 shown in FIG. 2 and a terminal installed at a place where the user is working, for example, is the terminal 1-4 shown in FIG. 3.

The following describes processing to be executed when, in the above-mentioned situation, the user sends an electronic mail from the terminal 1-4 installed in the workplace to the terminal 1—1 installed in the home to reserve a recording on the video deck.

Figure 4:
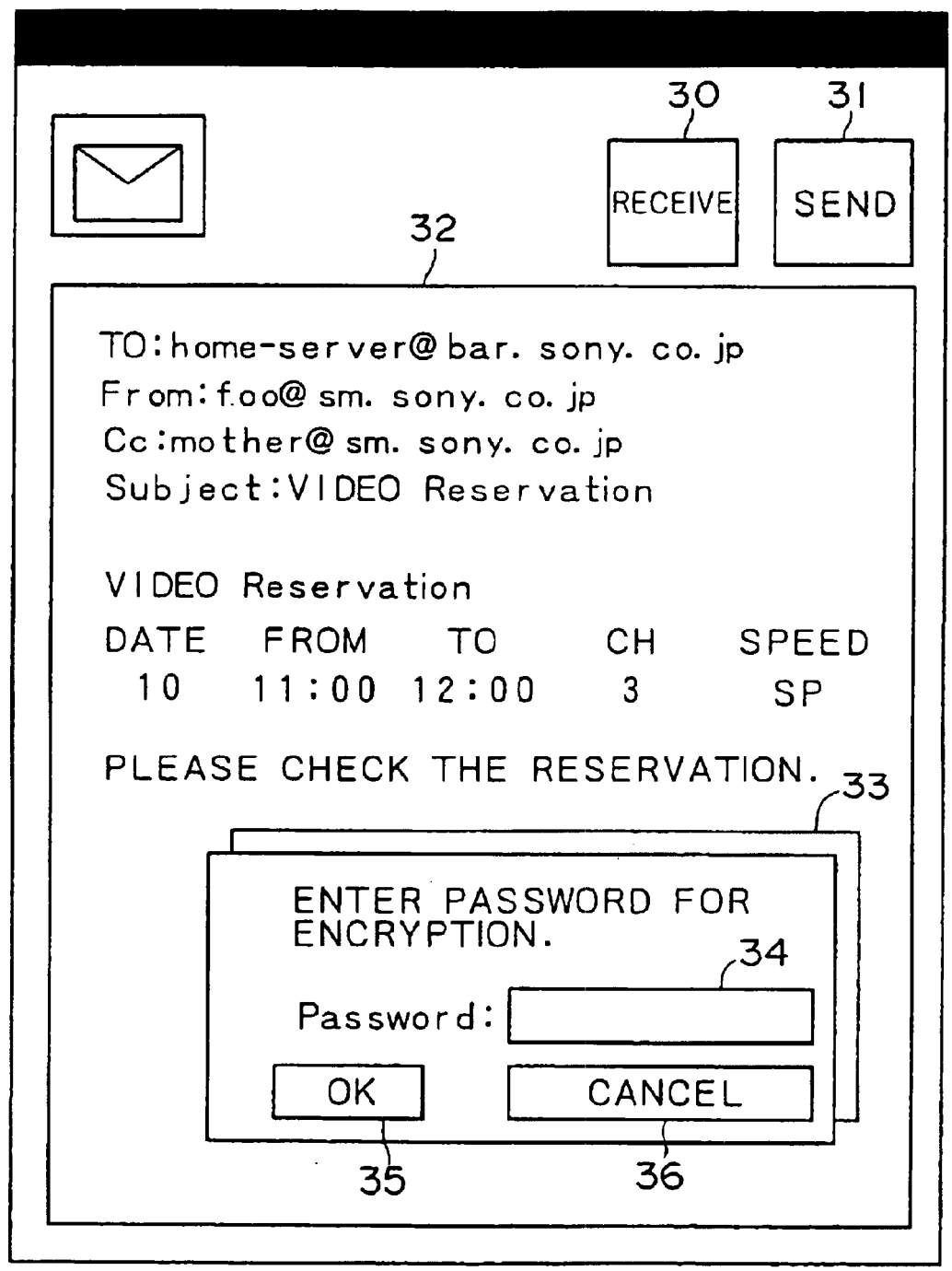
FIG. 4 is a diagram illustrating, by way of example, a display screen in which an electronic mail is inputted.

Now, it is assumed that the input block 24 (the input means) of the terminal 1-4 shown in FIG. 3 has been operated and an electronic mail input screen shown in FIG. 4 is displayed on the CRT monitor 25. In this screen, a RECEIVE button 30 in the upper right corner of the screen is operated to receive an electronic mail. A SEND button 31 is operated to send an electronic mail having a content entered in an input box 32. A password entry window 33 is displayed when the SEND button is pressed if the electronic mail includes a control command. It should be noted that, in this password input window 33, as described later, a secret key (a password) necessary for encryption is inputted in an input box 34. An OK button 35 in the window is operated to send the electronic mail by an inputted password. A CANCEL button 36 is operated to modify the content of the electronic mail to be sent.

It should be noted that the password (secret key) is a key confidentially kept by each user in public-key encryption (in which encoding and decoding are performed with keys of two types; a public key and a secret key). The other key (namely, the public key) is held in each terminal. Information encrypted by the secret key is decrypted by the corresponding public key.

It is assumed here that the user has entered the information into the screen shown in FIG. 4.

To be specific, line 1 of the input box 32 provides a destination "TO:" of the electronic mail. In this example, the destination is "home-server@bar.sony.co.jp". It should be noted that "home-server" preceding "@" indicates the ID name of the terminal 1—1 to which this electronic mail is destined. The character string following "@" indicates a domain name (for example, the domain name of the provider 3-1).

Line 2 provides the source "FROM:" of the electronic mail. In this example, the source is "foo@sm. sony.co.jp", in which "foo" preceding "@" indicates the ID name of this user and "sm.sony.co.jp" following "@" indicates a domain name (for example, the domain name of the provider 3-2).

Line 3 provides a second destination "Cc:" of the electronic mail. In this example, the second destination is "mother@sm.sony.co.jp", in which this ID "mother" represents the ID name of the mother of this user, for example.

Line 4 provides the title "Subject" of this electronic mail. In this example, the title is "VIDEO Reservation", which means reservation of a recording on the video deck 27 shown in FIG. 2.

Next comes "VIDEO Reservation", which is a control command for controlling the video deck 27, followed by characters for defining parameters for executing a recording reservation. Namely, these characters define to which parameters the numeric characters and alphabetic characters indicated below belong. In this example, the contents of the reservation are that channel (CH) 3 is to be recorded at standard (SP: Standard Play) speed (SPEED) from 11:00 (FROM) to 12:00 (TO) on the 10th (DATE). It should be noted that the order of these parameters may be changed as required.

Next comes a message. In this example, message "PLEASE CHECK THE RESERVATION" is inputted in this line, thereby transmitting the above-mentioned setting to the mother of the user, to whom this electronic mail is destined.

The processing for the password input window 33, displayed below the above-mentioned message, will be described later.

If the SEND button 31 is pressed in the above-mentioned display screen, the inputted electronic mail is sent. The processing for sending the electronic mail is executed by the processing shown in FIG. 5.

Figure 5:
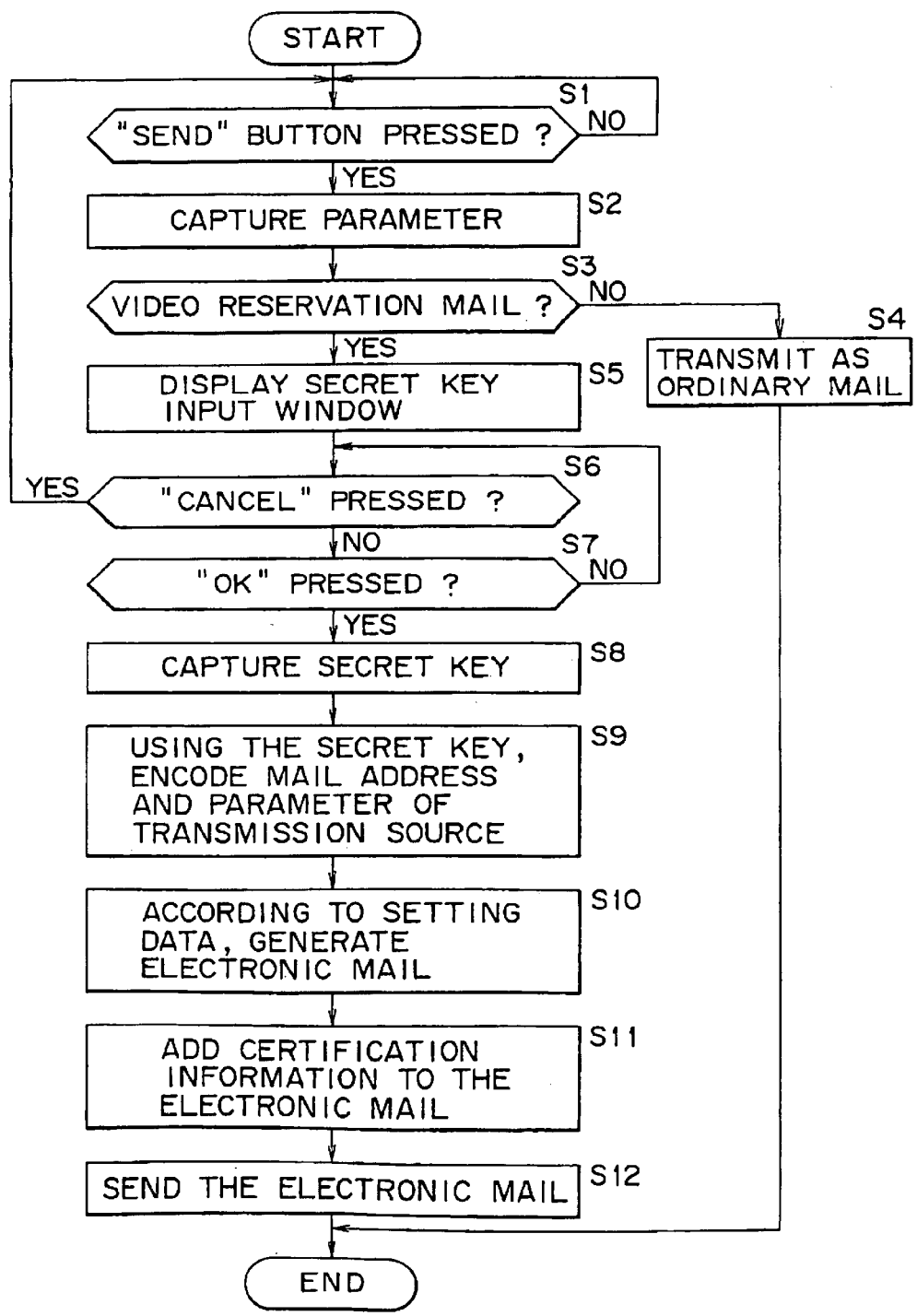
FIG. 5 is a flowchart for describing, by way of example, processing to be performed when the electronic mail input screen shown in FIG. 4 is displayed.

When the processing shown in FIG. 5 is executed, the CPU 22a (the encoding means, the first additional means, and the second additional means) of the terminal 1-4 determines, in step S1, whether the SEND button 31 has been pressed. If the SEND button 31 is found not pressed (NO), the CPU 22a repeats the above-mentioned processing in step S1 until the SEND button is pressed. If the SEND button is found pressed (YES), the processing goes to step S2.

In step S2, the CPU 22a captures the parameters inputted through the input screen shown in FIG. 4. In step S3, the CPU 22a references the captured parameters to determine whether this electronic mail is for a video reservation or not. If this electronic mail is found an ordinary electronic mail (NO), then, in step S4, the inputted information is sent as an ordinary electronic mail, upon which the processing comes to an end (END). If this mail is found to be for video reservation (YES), the processing goes to step S5.

In step S5, the CPU 22a displays the password (the secret key) input window shown in FIG. 4. Then, in step S6, the CPU 22a determines whether the CANCEL button 36 has been pressed or not. If the CANCEL button 36 is found pressed (YES), then, back in step S1, the CPU 22a repeats the above-mentioned processing. If the CANCEL button 36 is found not pressed (NO), the processing goes to step S7.

In step S7, the CPU 22a determines whether the OK button has been pressed or not. If the OK button is found not pressed (NO), then back in step S6, the CPU 22a repeats the above-mentioned processing. If the OK button is found pressed (YES), the processing goes to step S8.

In step S8, the CPU 22a captures the password (the secret key) inputted in the box 34. It should be noted that this password is an 8-digit alphabetic and numeric character string such as "89U3578".

In step S9, by use of the user secret key captured in step S5, the CPU 22a encrypts the mail address of the source of this electronic mail "foo@sm.sony.co.jp" and the parameters "10 11:00 12:00 3 SP" for recording reservation. It should be noted that, for this encoding, a public-key encryption algorithm (for example, the LUC algorithm) may be used.

In step S10, the CPU 22a generates an electronic mail based on the information inputted in the screen shown in FIG. 4. Then, in step S11, the CPU 22a adds the data encrypted in step S9 to the electronic mail generated in step S10 as user certification information. In step S12, the CPU 22a sends the generated electronic mail added with the certification information to the Internet 4 through the modem 21 (the sending means).

Referring to FIG. 6, there is shown a diagram illustrating, by way of example, the electronic mail sent as a result of the processing executed in FIG. 5. In this example, the destination mail address, the source mail address, the second destination mail address, the title of this electronic mail, the control command, the control parameters, and the message inputted in the display screen shown in FIG. 4 are written in this order. In addition, at the end of this electronic mail, the certification information "ASASJK . . . CHXZC" generated in step S9 shown in FIG. 5 is placed after header "EncryptedDATA-First".

This electronic mail is sent to the provider 3-1 over the Internet 4 to be stored in storage block, not shown, in the provider 3-1.

Figure 7A:
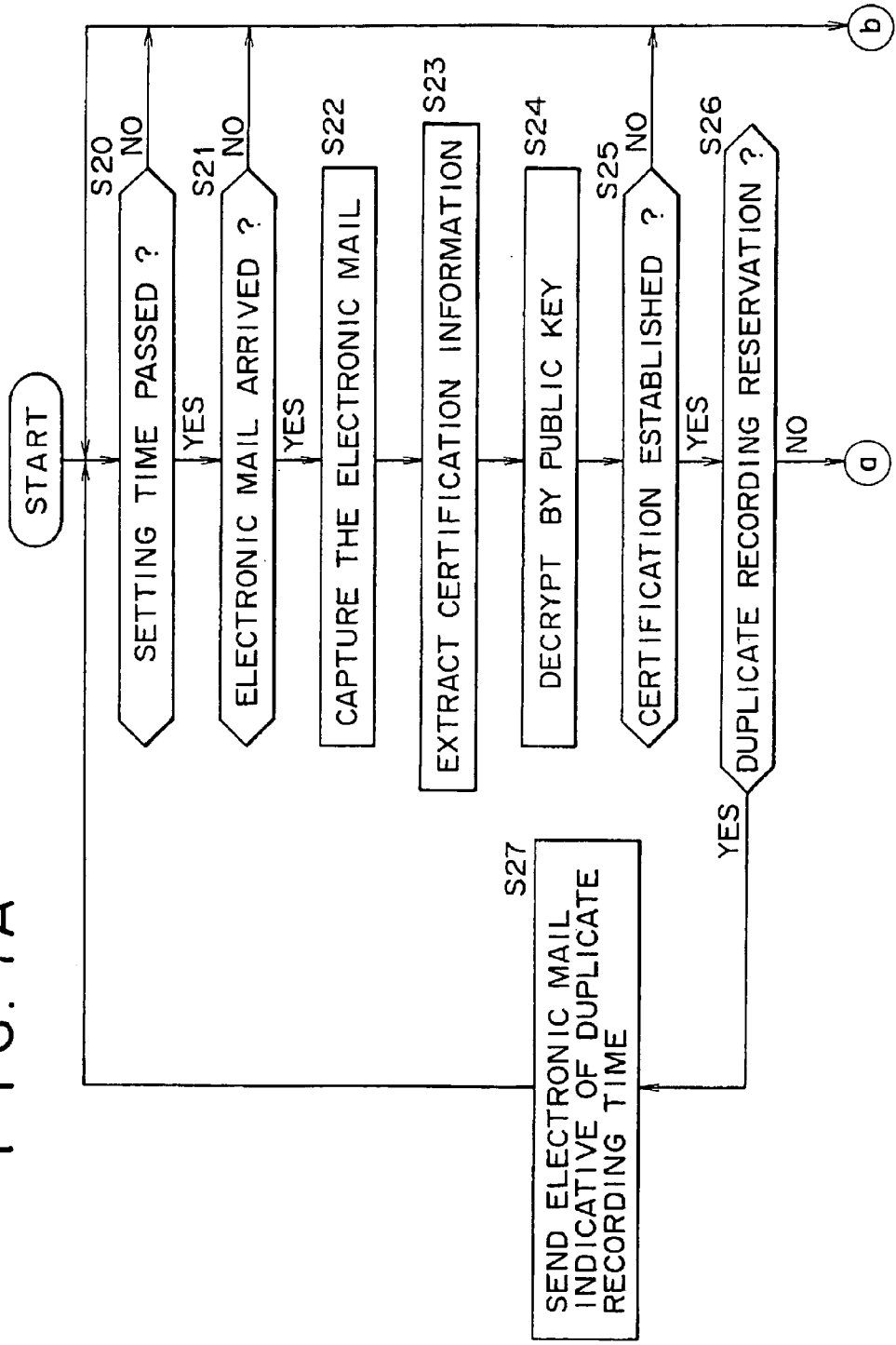
FIGS 7A and 7B are flowcharts for describing, by way of example, processing to be performed in the terminal 1—1 when the electronic mail shown in FIG. 6 is received.
Figure 7B:
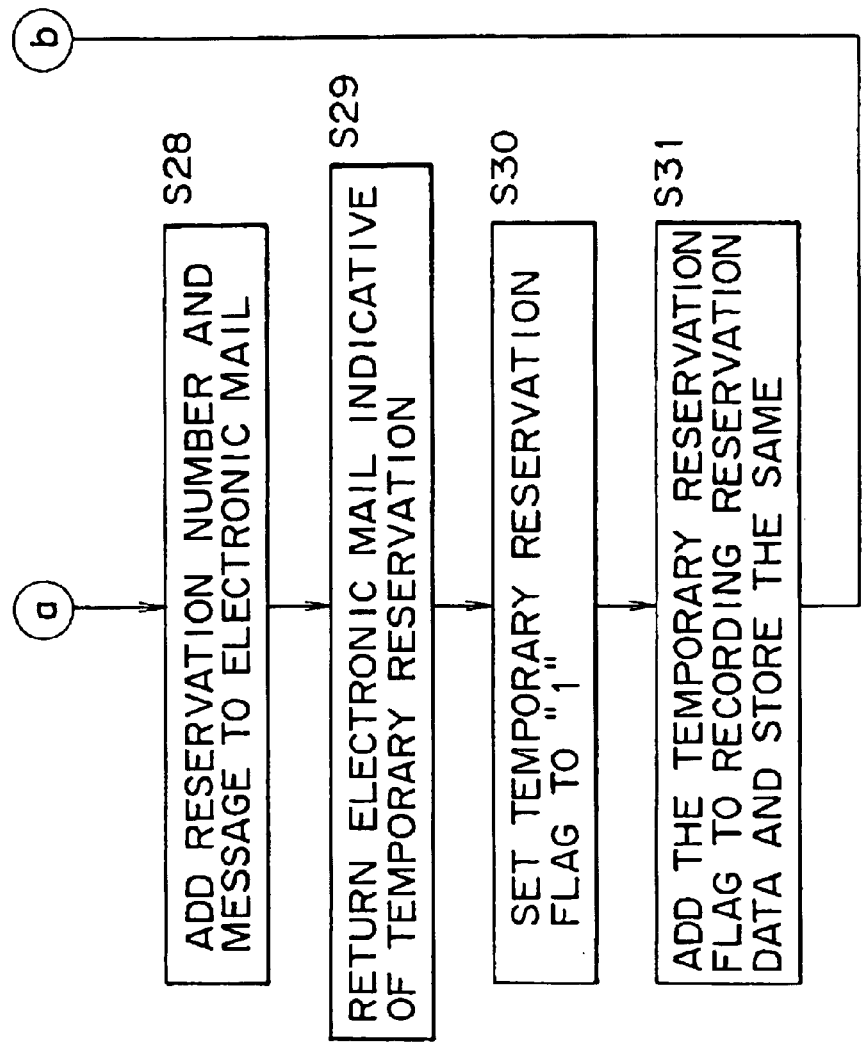
Figure 7:
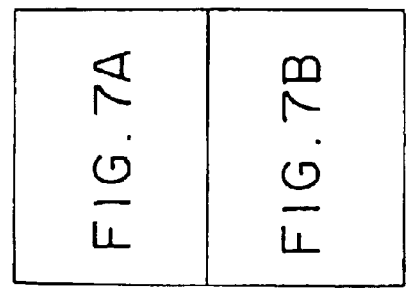

At this moment, the processing shown in FIG. 7 is being executed in the terminal 1—1, so that this electronic mail is received by the terminal 1—1.

To be specific, the CPU 22a determines in step S20 whether a preset time (for example, 10 minutes) has elapsed or not. If the preset time is found not yet elapsed (NO), then still in step S20, the CPU 22a repeats the above-mentioned processing until the preset time elapses. If the preset time is found elapsed (YES), the processing goes to step S21.

In step S21, the CPU 22a calls the provider 3-1 through the modem 21 and determines whether the electronic mail addressed to the terminal 1—1 has arrived. If the electronic mail is found not yet arrived (NO), then, back in step S20, the CPU 22a repeats the above-mentioned processing. If the electronic mail is found arrived (YES), the processing goes to step S22.

In step S22, the CPU 22a captures the electronic mail from the provider 3-1. Then, in step S23, the CPU 22a extracts the certification information (the information displayed at the end of the electronic mail shown in FIG. 6) from the captured electronic mail. Then, the processing goes to step S24.

In step S24, by use of the corresponding public key, the CPU 22a decrypts the certification information encrypted by use of the secret key in the terminal 1-4. It should be noted that, in this decryption, the processing generally similar to the above-mentioned encryption may be used.

In step S25, the CPU 22a makes a comparison between the information decrypted by use of the public key, the source mail address "foo@sm.sony.co.jp" stored in the electronic mail, and the recording reservation parameters "10 11:00 12:00 3 SP". If no match is found (NO), then, back in step S20, the CPU 22a repeats the above-mentioned processing. If a match is found (YES), the processing goes to step S26.

In step S26, the CPU 22a reads all of the recording reservation data from the RAM 22c and compares the read data with the reservation parameters included in the newly received electronic mail to determine whether there is an overlap between the recording times in the recording reservation data. If the recording reservation time is found overlapping (YES), then in step S27, the CPU 22a sends an electronic mail notifying the terminal 1-4 of the overlap between the recording reservation times. Then, back in step S20, the CPU 22a repeats the above-mentioned processing.

Referring to FIG. 8, there is shown a diagram illustrating, by way of example, the electronic mail that is sent in the processing of step 27. The electronic mail is sent to the terminal 1-4, so that the destination is the user mail address "foo@sm.sony.co.jp" and the source is the mail address of the terminal 1—1 "home-server@bar.sony.co. jp". The title of the mail is video reservation "VIDEO Reservation", followed by the command for reservation and the reservation parameters in this order. Below this, a message telling failure of reservation "RESERVATION FAILED BECAUSE RESERVATION DATA SENT AS ABOVE PARTIALLY OVERLAP WITH DATA OF RESERVATION NUMBER 1 IN RECORDING TIME" is written.

It should be noted that, if the recording reservation data is found not overlapping (NO) in step S26, the processing goes to step S28.

In step S28, the CPU 22a adds one to the number of pieces of recording reservation data stored in the RAM 22c and adds a resultant value to the electronic mail as a reservation number and, at the same time, adds a message (to be described later) indicating that the reservation has been accepted to the electronic mail. Consequently, an electronic mail as shown in FIG. 9 is generated. To be specific, in this example, that an acceptance number (a temporary reservation number) is "1" is displayed after the title of this electronic mail. At the center of this electronic mail, acceptance of the reservation is displayed and a message indicating an operation to be performed "TEMPORARY RESERVATION MADE AS ABOVE. CHECK THE CONTENT AND RETURN FOR FIXED RESERVATION" is inserted. The electronic mail thus generated is sent to the terminal 1-4 in step S29.

In step S30, the CPU 22a sets a temporary reservation flag indicating that the recording reservation data are in a temporary reservation state (to be described later) to "1". In step S31, the CPU 22a adds this temporary reservation flag to the newly received reservation data and stores the resultant data into the RAM 22c. Then, back in step S20, the CPU 22a repeats the above-mentioned processing.

It should be noted that the temporary reservation state denotes the state in which the recording reservation has been accepted for the first time. In this state, therefore, no recording operation is performed. To start a recording operation, the recording reservation data must be taken from the temporary reservation state into the fixed reservation state.

The following describes the processing for taking the recording reservation data from the temporary reservation state into the same into the fixed reservation state.

Figure 10:
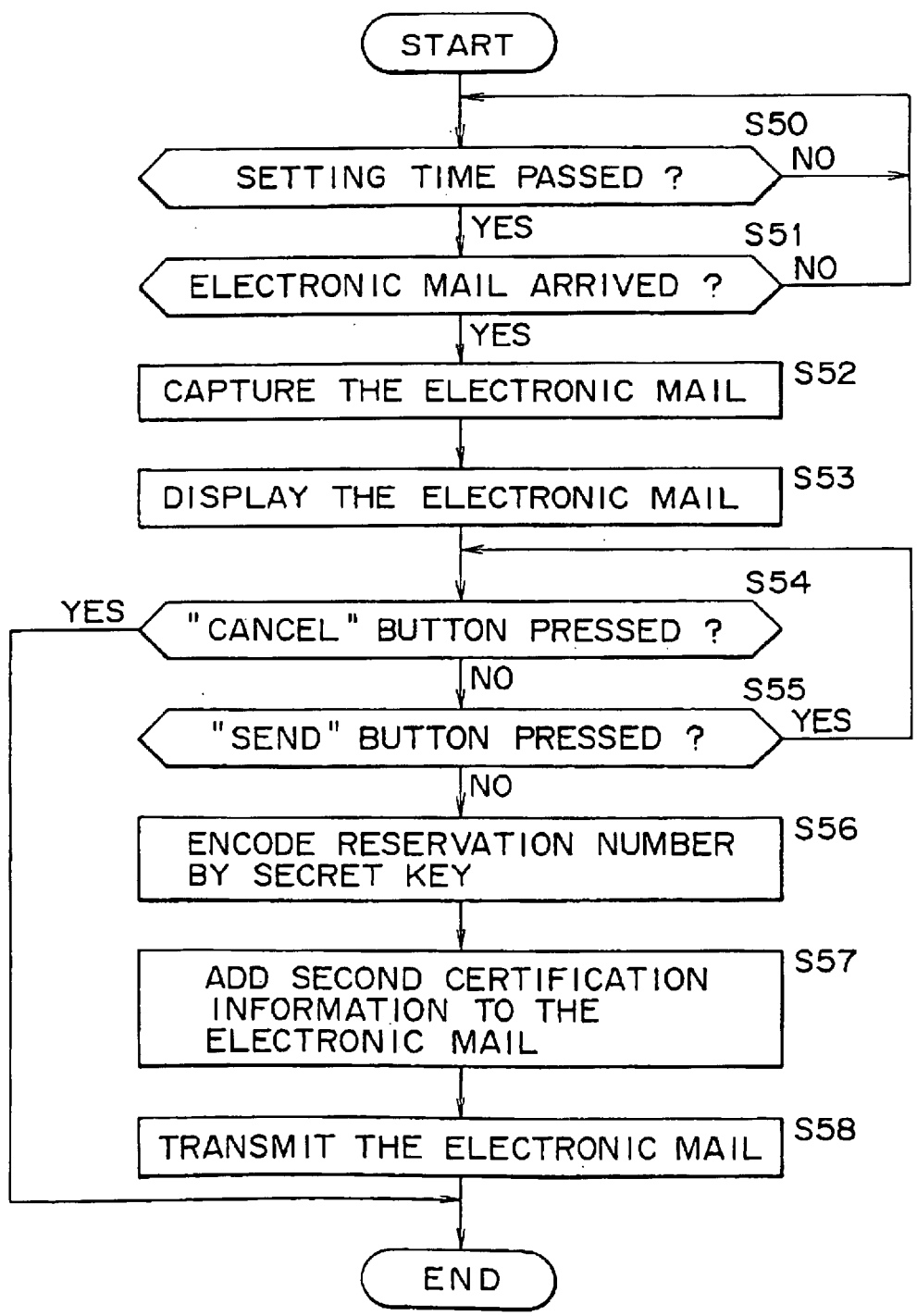
FIG. 10 is a flowchart for describing, by way of example, processing to be performed when the terminal 1-4 receives an electronic mail for confirming setting to be sent upon establishment of certification after execution of the processing shown in FIG. 7.

Referring to FIG. 10, there is shown a flowchart for describing, by way of example the processing to be performed in the terminal 1-4 when receiving the electronic mail sent in step S29 shown in FIG. 7.

Executing this processing, the CPU 22a of the terminal 1-4 determines in step S50 whether a preset time (for example, 10 minutes) has elapsed or not. If the preset time is found not yet elapsed (NO), then still in step S50, the CPU 22c repeats the above-mentioned processing. If the preset time is found elapsed (YES), the processing goes to step S51.

In step S51, the CPU 22a closes the line with the provider 3-2 to determine whether the electronic mail to the terminal 1-4 has arrived. If no mail is found arrived (NO), then back in step S50, the CPU 22a repeats the above-mentioned processing. If the mail is found arrived (YES), the processing goes to step S52.

In step S52, the CPU 22a captures the electronic mail from the provider 3-2 through the modem 21 and stores the captured electronic mail into the RAM 22c at a predetermined area. Then, the processing goes to step S53.

In step S53, the CPU 22a displays the electronic mail stored in the RAM 22c onto the CRT monitor 25. As a result, an image shown in FIG. 11, for example, is displayed.

Figure 11:
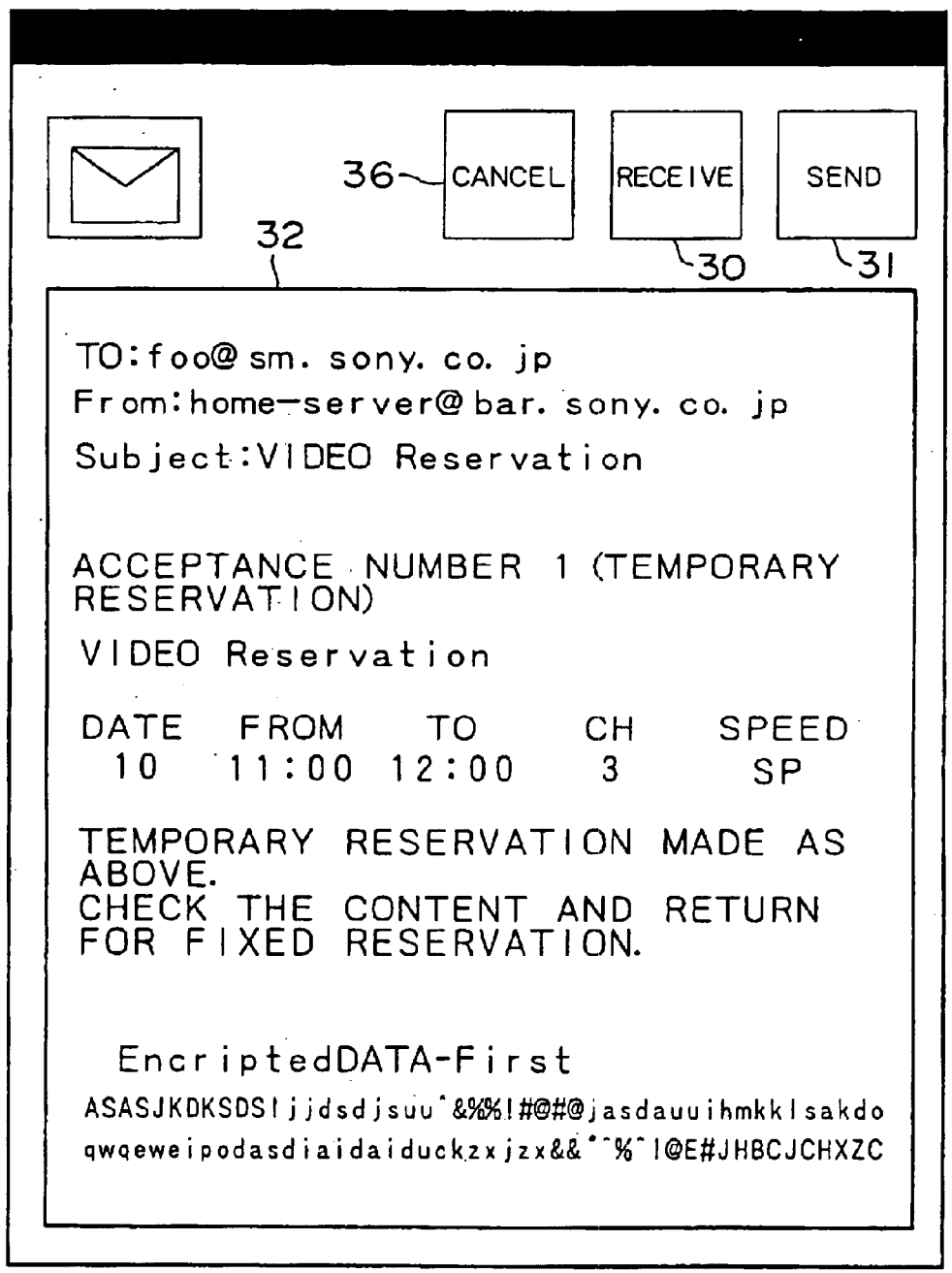
FIG. 11 is a diagram illustrating, by way of example, a screen to be displayed on CRT monitor 25 of the terminal 1-4 when the processing shown in FIG. 10 has been executed.

In the example shown in FIG. 11, the user mail address "foo@sm.sony.co.jp" is displayed as the mail destination. The mail address of the terminal 1—1 "home-server@bar.sony.co.jp" is displayed as the mail source. The title of this mail is "VIDEO Reservation", indicating that this mail is associated with video recording reservation.

At the upper right of FIG. 11, the RECEIVE button 30 and the SEND button 31 are displayed like those shown in FIG. 4. The CANCEL button 36 is displayed to the left of the RECEIVE button. The CANCEL button 36 is operated to cancel the setting made this time.

Below the above-mentioned buttons, the reception number indicates that the information of the electronic mail sent by the previous operation (as shown in the screen of FIG. 4) has been accepted (temporarily accepted) as the information of acceptance number 1. Immediately after this, the contents of the reservation are displayed. The message below this indicates that the temporary reservation has been accepted and provides information about an operation to be performed. At the bottom, the first certification information added in the previous sending processing is displayed.

Referring to FIG. 10 again, the CPU 22a of the terminal 1-4 determines in step S54 whether the CANCEL button 36 has been pressed or not. If the CANCEL button 36 is found pressed (YES), the CPU 22a ends the processing (END). If the CANCEL button 36 is found not pressed (NO), the processing goes to step S55.

In step S55, the CPU 22a determines whether the SEND button 31 has been pressed or not. If the SEND button 31 is found not pressed (NO), then back in step S54, the CPU 22a repeats the above-mentioned processing. If the SEND button 31 is found pressed (YES), the processing goes to step S56.

In step S56, the CPU 22a encrypts the acceptance number ("1" in this example) included in the electronic mail and the source mail address ("foo@sm.sony.co.jp" in this example) by use of the secret key inputted in the display screen of FIG. 4. In step S57, the CPU 22a adds the certification information (refer to FIG. 6) added to the electronic mail sent from the terminal 1—1 to the electronic mail as the first certification information and, at the same time, adds the certification information newly obtained in step S56 to the electronic mail as the second certification information, sending the resultant electronic mail to the terminal 1—1.

Consequently, the electronic mail as shown in FIG. 12 is sent from the terminal 1-4. Namely, in this example, the mail address of the terminal 1—1 is written as the destination and the mail address of the user is written as the source. For the title, "VIDEO Reservation" is written, indicating that this electronic mail is associated with video recording reservation.

On the next line, the acceptance number, the control command, and the reservation parameters are written. Below this line, the message sent from the terminal 1—1 is copied without change. Below this message, the first certification information (the same data as shown in FIG. 6, namely "Encrypted DATA-First") and the second certification information (the data with the reservation number encrypted, namely "Encrypted DATA-Second") are written.

The above-mentioned electronic mail is sent to the provider 3-1 over the Internet 4 to be stored therein.

Figure 13A:
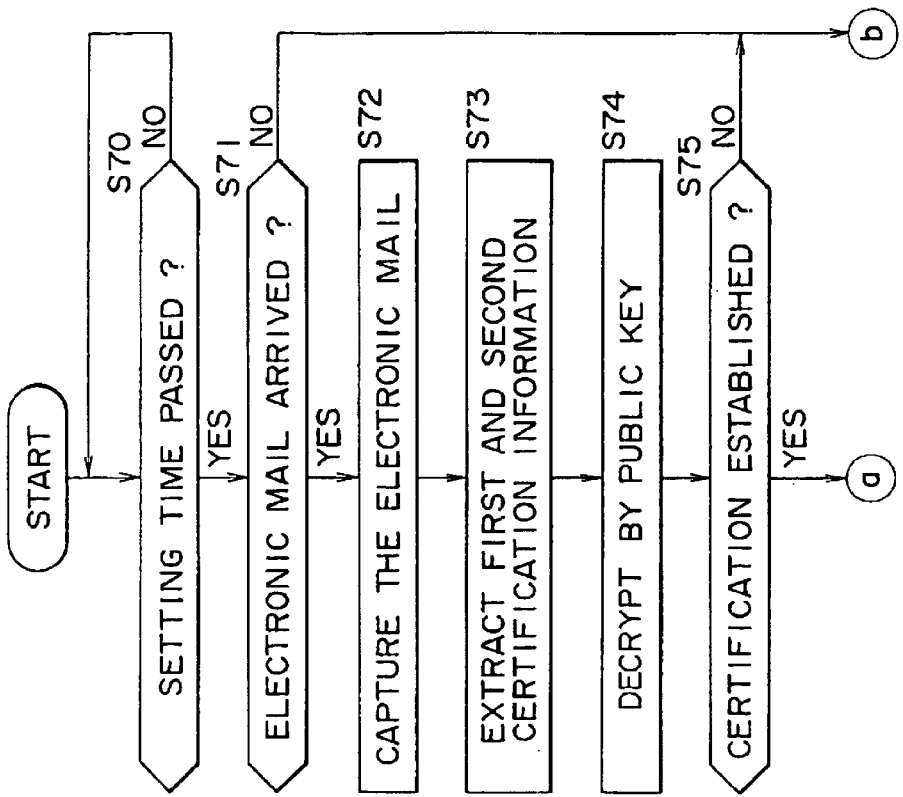
FIGS 13A and 13B are flowcharts for describing, by way of example, processing to be executed in the terminal 1—1 when the electronic mail shown in FIG. 12 is received.
Figure 13:
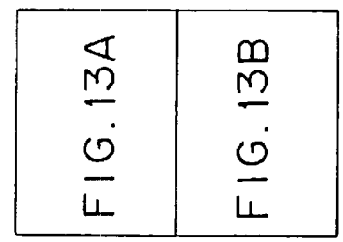

Referring to FIG. 13, there is shown a flowchart for describing, by way of example, processing to be executed in the terminal 1—1 when the electronic mail sent from the terminal 1-4 is received.

Executing this processing, the CPU 22a of the terminal 1—1 determines in step S70 whether the preset time (for example, 10 minutes) has elapsed or not. If the preset time is found not yet elapsed (NO), then still in step S70, the CPU 22a repeats the above-mentioned processing. If the preset time is found elapsed (YES), the processing goes to step S71.

In step S71, the CPU 22a closes the communication line with the provider 3-1 and determines whether the electronic mail addressed to the terminal 1—1 has arrived at the provider 3-1. If the electronic mail is found not arrived (NO), the CPU 22a ends the processing (END). If the electronic mail is found arrived (YES), the processing goes to step S72.

In step S72, the CPU 22a reads the electronic mail that has arrived at the provider 3-1 and stores this mail into the RAM 22c at a predetermined area. Then, the processing goes to step S73.

In step 573, the CPU 22a extracts the first certification information ("Encrypted DATA-First" shown in FIG. 12) and the second certification information ("Encrypted DATA-Second" shown in FIG. 12) from the mail stored in the RAM 22c. Then, in step S74, the CPU 22a decrypts the first and second certification information by use of the public key. The processing goes to step S75.

In step S75, the CPU 22a makes a comparison between the first certification information decrypted by the public key, the source mail address, and the recording reservation parameters. The CPU 22a also makes a comparison between the second certification information decrypted by the public key, the reservation number, and the source mail address. If a match is found (YES), it is determined that certification has been established. The processing goes to step S76. If no match is found (NO), the CPU 22a ends the processing (END).

In step S76, the CPU 22a searches the RAM 22a for specified recording reservation data (the recording reservation data containing the reservation number written in the terminated electronic mail). If the specified recording reservation data is not found (NO), then in step S78, the CPU 22a sends an electronic mail indicating that the specified reservation data has not been found to the terminal 1-4 and ends the processing (END). If the specified recording reservation data is found (YES), then in step S77, the CPU 22a sets the temporary reservation flag to "0" to change the temporary reservation to a fixed reservation. Then, the processing goes to step S79.

In step S79, an electronic mail indicating that the reservation has been completed is sent to the terminal 1-4. FIG. 14 shows such an electronic mail by way of example. In this example, each of the user mail address and the terminal mail address is written as the address of the source or the destination. The title of the mail indicates that this mail is for a video recording reservation. Below the title, the reservation number "1" is displayed, indicating that a fixed reservation has been made with the recording reservation data shown below. Next comes a message "RESERVATION MADE AS ABOVE", indicating that the recording reservation has been made. Below this message, the first certification information and the second certification information are written.

Receiving the above-mentioned electronic mail, the user knows that the electronic mail sent before was accepted and the recording reservation has been executed correctly.

When the processing of step 79 has been completed, the CPU 22a ends the processing (END).

Figure 15B:
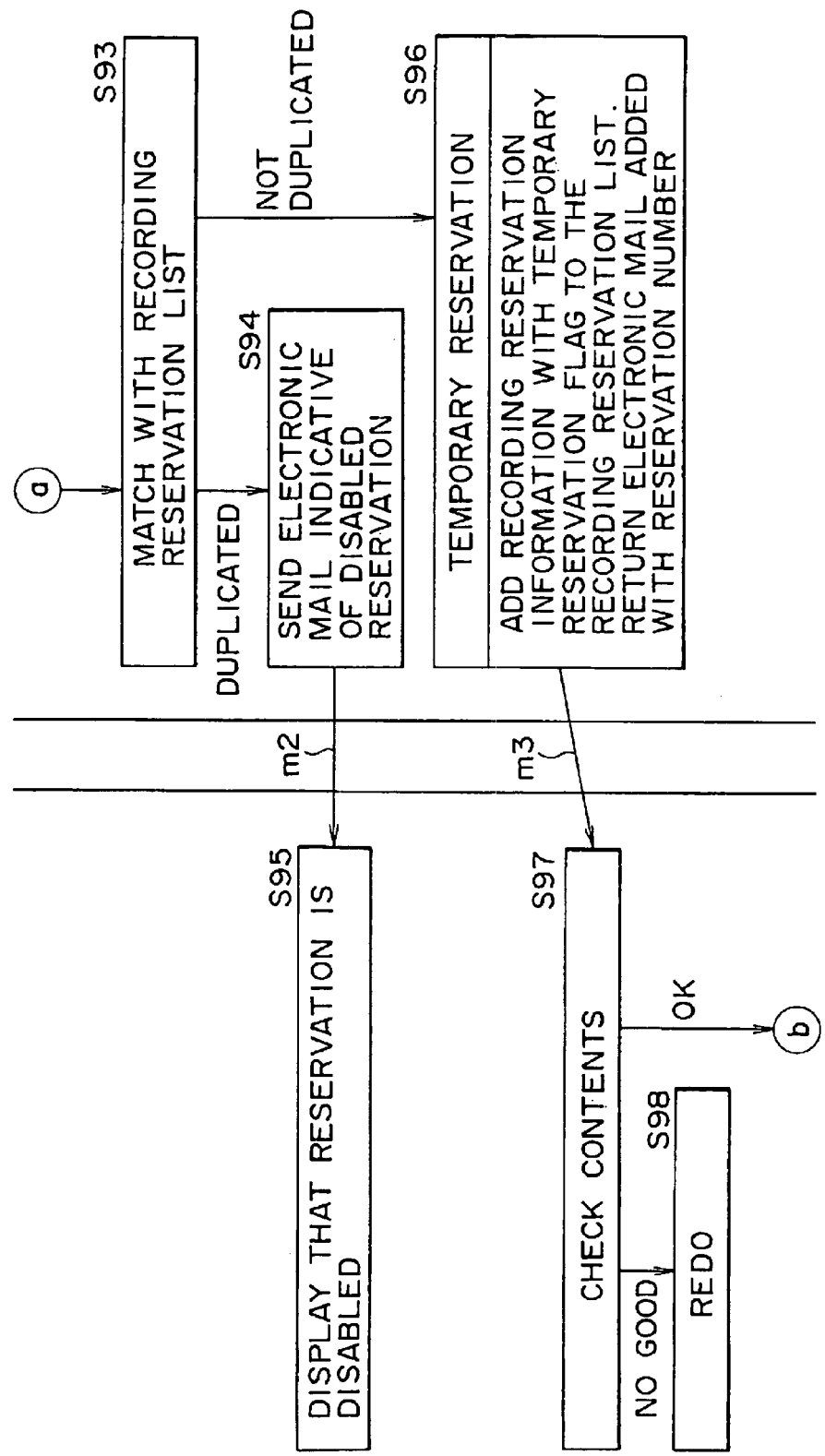

Referring to FIG. 15, there is shown a flowchart that describes the sequence of processing from sending of an electronic mail to completion of reservation. The following briefly describes this sequence with reference to FIG. 15. It should be noted that the right side of the figure shows the sequence of processing to be executed in the terminal 1—1, while the left side shows the sequence of processing to be executed in the terminal 1-4.

In FIG. 15, the input screen shown in FIG. 4 is displayed on the terminal 1-4, through which an electronic mail is inputted in step S90. At the same time, the secret key of the user is also inputted. The CPU 22a of the terminal 1-4 captures the mail address of the source and the recording reservation parameters from the inputted information by use of the above-mentioned secret key, encrypts the captured information, and adds the encrypted information to an electronic mail m1 as certification information (refer to FIG. 6). The CPU 22a sends the electronic mail thus generated to the terminal 1—1.

The terminal 1—1 receives the electronic mail m1 from the terminal 1-4 and executes certification processing to determine whether the user who has sent the electronic mail m1 is an authorized user or not. To be specific, the CPU 22a of the terminal 1—1 extracts the certification information ("Encrypted DATA-First") from the received electronic mail and decrypts the extracted information by use of the public key. Then, the CPU 22a extracts the source mail address and the recording reservation parameters from the electronic mail and compares the decrypted information with the extracted information to determine whether the user who sent this mail is authorized (the user having the authorized secret key), thereby executing certification.

If the certification has not been established (that is, if the sender of the electronic mail is not an authorized user), the processing goes to step S92, ignoring the reservation specified by the electronic mail. If the certification has been established, the CPU 22a makes a comparison between the newly sent recording reservation information and the recording reservation data stored in the RAM 22c to check for data in which recording times overlap.

If overlapping data are found, then in step S94, the CPU 22a sends an electronic mail m2 (refer to FIG. 8) indicating that the reservation is disabled to the terminal 1-4. Consequently, the terminal 1-4 knows by this mail that the reservation is disabled.

If no overlapping data are found, then in step S95, the CPU 22a adds the temporary reservation flag set to "1" (indicative of the temporary reservation state) to the recording reservation data and stores the resultant data into the RAM 22c. Then, the CPU 22a of the terminal 1—1 adds the reservation number of the recording reservation data newly stored in the RAM 22c and a message to an electronic mail m3 (refer to FIG. 9) and sends the resultant mail to the terminal 1-4.

The terminal 1-4 receives the above-mentioned electronic mail in step S96, which is displayed as shown in FIG. 11. When the user presses the CANCEL button 36 in this screen, it indicates the previously made setting is not approved by the user. The processing goes back to step S90, in which the electronic mail is sent again. If the SEND button is pressed in the screen shown in FIG. 11, it indicates that the setting has been approved by the user. The processing goes to step S98.

In step S99, the CPU 22a of the terminal 1-4 extracts the source mail address and the reservation number of the received electronic mail and encrypts the extracted information by use of the secret key inputted from the screen shown in FIG. 4. Then, the CPU 22a adds the encrypted information as the second certification information and the information (the encrypted source mail address and reservation parameters) shown at the bottom of FIG. 6 as the second certification information to an electronic mail m4 (refer to FIG. 12) and sends the resultant mail to the terminal 1—1.

In step 100, the terminal 1—1 receives this mail from the terminal 1-4. The CPU 22a extracts the first certification information and the second certification information from the mail and decrypts the extracted information by use of the public key. The CPU 22a compares the first certification information with the source mail address and the reservation parameters for certification. On the other hand, the CPU 22a compares the second certification with the source mail address and the reservation number for certification.

If the certification has not been established (that is, if no match is found in the comparison in one or both of the first certification information and the second certification information), then the processing goes to step S101, in which the specified data are held in the temporary reservation state. On the other hand, if the certification has been established, the CPU 22a sets the temporary reservation flag added to the specified recording reservation data to "0" to change temporary reservation to fixed reservation. Then, the CPU 22a sends an electronic mail m5 (refer to FIG. 14) indicative of completion of the reservation and ends the processing. The terminal 1-4 receives this mail m5 to know that the reservation has been completed.

Thus, certifying the sender of the electronic mails by use of the certification information prevents unauthorized control of the electric devices by the electronic mails sent by parties other than an authorized authentic user.

The following describes the recording processing to be executed on the terminal 1—1.

By the above-mentioned sequence of processing, the first recording reservation data sent from the outside terminal 1-4 is stored in the RAM 22c of the home terminal 1—1 to be put in the temporary reservation state. Further, the second electronic mail is sent and, when temporary reservation is changed to fixed reservation, the CPU 22a of the terminal 1—1 controls the video deck 27 according to the processing shown in FIG. 16, starting the recording at a reserved time.

Figure 16B:
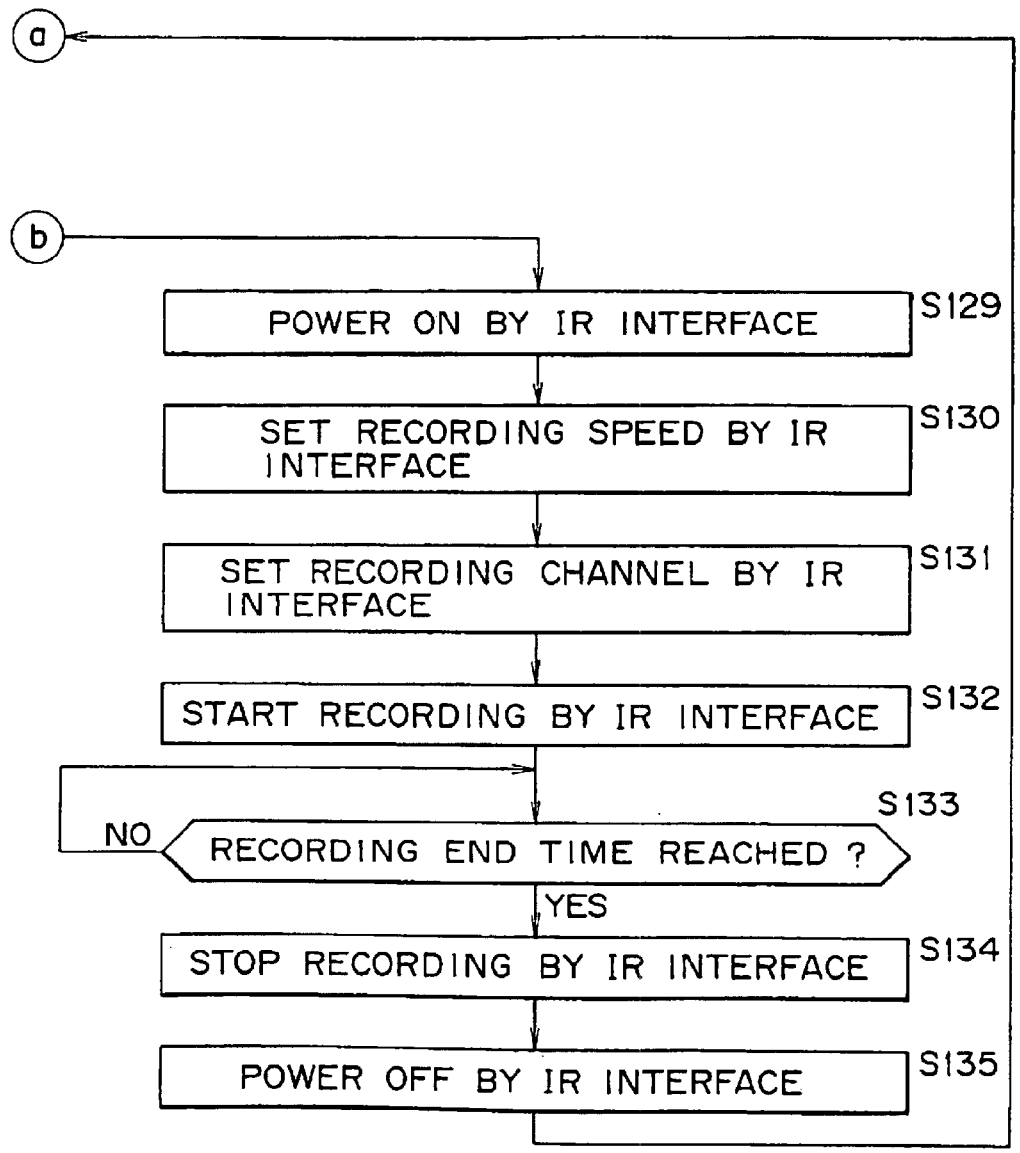
FIGS. 16A and 16B are flowcharts for describing, by way of example, processing to be executed in the terminal 1—1 when reservation for recording has been performed by electronic mail.
Figure 16:
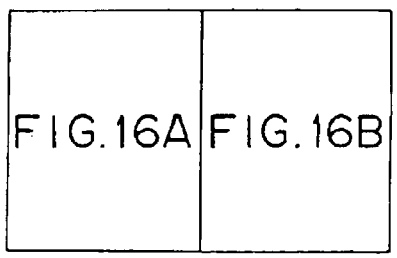

Executing the processing shown in FIG. 16, the CPU 22a of the terminal 1—1 compares the output data of the timer 22d with the fixedly reserved recording reservation data stored in the RAM 22c in step S120 to determine whether the recording start time has come or not. If the recording start time is found not yet reached (NO), then still in step S120, the CPU 22a repeats the above-mentioned processing. If the recording start time is found reached (YES), the processing goes to step S121.

In step S121, the CPU 22a determines whether the video deck 27 is connected by cable or not. To be specific, the CPU 22a determines whether the video deck 27 is connected to the gateway 20 by the connection cable 28. If the video deck 27 is found connected by cable (YES), the processing goes to step S122. If the video deck 27 is found not connected by cable (NO), the processing goes to step S129.

In the preferred embodiment shown in FIG. 2, the video deck 27 is connected to the gateway 20 by both cable and the IR transmitter 26. In this case, connection by the connection cable 28, which is higher in transfer rate and reliability than the IR transmitter 26, is preferred.

Referring to FIG. 16 again, if the decision is YES in step S121, then in step S122, the CPU 22a powers on the video deck 27 through cabled interface (namely, the connection cable 28). In step S123, the CPU 22a sets the recording speed according to the recording reservation data (for example, sets the recording speed to SP mode) through the cabled interface.

In step S124, the CPU 22a sets the recording channel in the video deck 27 through the cabled interface according to the recording reservation data. Further, in step 125, the CPU 22a sends a predetermined control signal to the video deck 27 through the cabled interface, starting recording.

In step S126, the CPU 22a compares the output data of the timer 22d with the recording end time in the recording reservation data stored in the RAM 22c to determine whether the recording end time has come. If the recording end time is found not yet reached (NO), then still in step S126, the CPU 22a repeats the above-mentioned processing until the recording end time comes. If the recording end time is found reached (YES), then in step S127, the CPU 22a stops recording on the video deck 27 through the cabled interface. Then, in step S128, the CPU 22a powers off the video deck 27 and returns to step S120 to repeat the above-mentioned processing.

If, in step S121, the video deck 27 is found not connected by cable (NO), then in step S129, the CPU 22a sends a predetermined control signal through the IR interface (namely, the IR transmitter 26), powering on the video deck 27.

Next, in step S130, the CPU 22a sets the recording speed according to the recording reservation data through the IR interface.

In step 131, the CPU 22a compares the output data of the timer 22d with the recording reservation data stored in the RAM 22c to determine whether the recording end time has come. If the recording end time is found not yet reached (NO), then in step 133, the CPU 22a repeats the above-mentioned processing until the recording end time comes. If the recording end time is found reached (YES), then in step S134, the CPU 22a stops the video 27 through the IR interface. Next, in step S135, the CPU 22a powers off the video deck 27 and returns to step S120 to repeat the above-mentioned processing.

According to the above-mentioned processing, the video deck 27 can be controlled according to the recording reservation data stored in the RAM 22c, thereby recording a desired program.

As described, the above-mentioned preferred embodiment allows the user to control electric appliances such as a video deck installed in home by sending an electronic mail from a terminal outside home. At the same time, the user can check whether a specified electric appliance can be set remotely and confirm the control settings by sending an electronic mail.

According to the above-mentioned preferred embodiment, if the reservation contents overlap (for example, recording times overlap), the reservation information received later is ignored, resulting in exclusive control, which can prevent duplicate reservation and contradiction in reservation from happening.

In the above-mentioned preferred embodiment, the video deck 27 is used, for example, as an electric devices which is controlled by the gateway 20. It will be apparent that the present invention is not restricted to the video deck and therefore applicable to any other electric devices such as air conditioner and a audio device.

In the above-mentioned preferred embodiment, the terminals 1—1 through 1-6 are interconnected through the Internet 4 and the providers 3-1 and 3-2. It will be apparent that the terminals can also be interconnected by other transmission media.

In the above-mentioned preferred embodiment, public-key encryption is used. It will be apparent that secret-key encryption (also called common-key encryption) may also be used.

Japanese Patent Application Number 09064230 filed on Mar. 18, 1997, discloses a similar receiver controlled by Network Protocol. This application is owned by the assignee of the present invention and the corresponding US application is still pending.

While the preferred embodiments of the present invention have been described using specific terms, such description is for illustrative purposes only, and it is to be understood that changes and variations may be made without departing from the spirit or scope of the appended claims.

What is claimed is:

1. A reception device for controlling a video recording device physically separate from to the reception device, the reception device comprising:

reception means for receiving an electronic mail transmitted through a network by a sender;

first extracting means for extracting encrypted certification information inserted in said electronic mail received by said reception means;

second extracting means for extracting a control command inserted in said electronic mail received by said reception means for controlling a remote timer video recording reservation function of the physically separate video recording device, wherein said control command is added to said electronic mail to reserve an operation time of said physically separate video recording device;

decrypting means for decrypting said certification information extracted by said first extracting means;

certifying means for certifying, by referencing the certification information decrypted by said decrypting means, whether the sender of said electronic mail is an authorized user;

means for determining if the control command extracted by the second extracting means is seeking an operation time duplicating one already reserved and informing the sender by electronic mail if so;

storing means for storing, if said sender of said electronic mail has been certified by said certifying means to be an authorized user and if the means for determining determines there is no duplicated operation time request, said control command extracted by said second extracting means; and control means for controlling said timer video recording reservation function of the physically separate video recording device to reserve an operation time of said physically separate video recording device based on said control command stored in said storing means.

2. A receiving apparatus as claimed in claim 1, wherein said certification information is predetermined text information in an encrypted state.

3. A receiving apparatus as claimed in claim 1, wherein said certification information inserted in said electronic mail is predetermined information encrypted by use of a private key owned by said authorized user and said decrypting means decrypts said certification information extracted by said first extracting means by use of a public key.

4. A reception method for controlling a video recording device performed without using interior components of the video recording device, the reception method comprising the steps of:

receiving an electronic mail transmitted through a network by a sender;

a first extracting step of extracting encrypted certification information inserted in said electronic mail received in said receiving step;

a second extracting step of extracting a control command added to said electronic mail to control a reservation function of said video recording device so as to reserve an operation time of said video recording device;

decrypting said certification information extracted in said first extracting step;

certifying, by referencing the certification information decrypted in said decrypting step, whether the sender of said electronic mail is an authorized user;

determining if the control command extracted in the second extracting step is seeking an operation time duplicating one already reserved and informing the sender by electronic mail if it is;

storing, if said sender of said electronic mail has been certified in said certifying step to be an authorized user and if the determining step determines there is no duplicated operation time request, said control command extracted in said second extracting step; and controlling said reservation function of said video recording device so as to reserve the operation time thereof based on said control command stored in said storing step.

5. A transmitting/reception system for controlling a video recording device physically separate therefrom, the transmitting/reception system comprising:

input means for generating at least a portion of an electronic mail;

encrypting means for encrypting predetermined information;

first addition means for adding, as certification information, the information encrypted by said encrypting means to said electronic mail generated by said input means;

second addition means for adding a control command to said electronic mail to control a reservation function of the video recording device to reserve an operation time thereof;

transmission means for transmitting through a network said electronic mail with said certification information added by said first addition means and said control command added by said second addition means;

receiving means for receiving an electronic mail indication from the network that no requested operation time has been entered when there is an overlap of the requested operation time with any previously entered operation times;

reception means for receiving said transmitted electronic mail through the network at a location of the video recording device;

first extraction means for extracting said certification information from said electronic mail received by said reception means;

second extraction means for extracting said control command from said electronic mail received by said extraction means;

decrypting means for decrypting said certification information extracted by said first extraction means;

certifying means for certifying, by referencing said certification information decrypted by said decrypting means, whether a sender of said electronic mail is an authorized user;

means for determining if the control command extracted by the second extracting means is seeking an operation time duplicating one already reserved and transmitting an electronic mail on the network indicating that no reservation has been entered because the control command extracted in the second extracting step is seeking an operation time duplicating one already entered;

storing means for storing, if said sender of said electronic mail has been certified by said certifying means to be an authorized user and if the means for determining determines there is no duplicated operation time request, said control command extracted by said second extracting means; and control means for controlling said reservation function of the video recording device to reserve an operation time thereof based on said control command stored in said storing means.

6. A transmitting/reception method for controlling a video recording device performed without using interior components of the video recording device, the transmitting/reception method, comprising the steps of:

inputting information to generate at least a portion of an electronic mail;

encrypting predetermined information;

a first adding step of adding, as certification information, information encrypted in said encrypting step to said electronic mail generated in said inputting step;

a second adding step of adding to said electronic mail a control command to control a reservation function of the video recording device to reserve an operation time thereof;

transmitting through a network said electronic mail with said certification information added in said first adding step and said control command added in said second adding step;

and receiving an electronic mail indication from the network that no reservation for the requested operation time has been made when there is an overlap of the requested operation time with any previously entered operation times;

receiving said transmitted electronic mail from the network at a location of the video recording device;

a first extracting step of extracting said certification information from said received electronic mail;

a second extracting step of extracting said control command from said received electronic mail;

decrypting said certification information extracted in said first extracting step;

certifying, by referencing said certification information decrypted in said decrypting step, whether a sender of said electronic mail is an authorized user;

determining if the control command extracted in the second extracting step is seeking an operation time duplicating one already reserved and transmitting an electronic mail on the network indicating that no reservation has been made because the control command extracted in the second extracting step is seeking a duplicate operation time of one already reserved;

storing, if said sender of said electronic mail has been certified in said certifying step to be an authorized user, and if the determining step determines there is no duplicated operation time request, said control command extracted in said second extracting step; and controlling said reservation function of the video recording device to reserve an operation time thereof based on said control command stored in said storing step.

* * * * *